US012755576B2

(12) United States Patent

Higa et al.

(10) Patent No.: US 12,755,576 B2
(45) Date of Patent: Oct. 6, 2026

(54) INFORMATION PROCESSING APPARATUS, INFORMATION PROCESSING METHOD, AND COMPUTER-READABLE NON-TRANSITORY STORAGE MEDIUM

(71) Applicant: NEC Corporation, Tokyo (JP)

(72) Inventors: Kyota Higa, Tokyo (JP); Yasunori Babazaki, Tokyo (JP); Ryuhei Ando, Tokyo (JP)

(73) Assignee: NEC CORPORATION, Tokyo (JP)

( * ) Notice: Subject to any disclaimer, the term of this patent is extended or adjusted under 35 U.S.C. 154(b) by 425 days.

(21) Appl. No.: 18/203,383

(22) Filed: May 30, 2023

(65) Prior Publication Data

US 2023/0394883 A1 Dec. 7, 2023

(30) Foreign Application Priority Data

Jun. 6, 2022 (JP) ................................ 2022-091611

(51) Int. Cl.
*G06V 40/20* (2022.01)
*G06V 20/40* (2022.01)

(52) U.S. Cl.
CPC ............. *G06V 40/20* (2022.01); *G06V 20/44* (2022.01)

(58) Field of Classification Search
CPC ... G06V 20/44; G06V 40/20; G06V 2201/033
See application file for complete search history.

(56) References Cited

U.S. PATENT DOCUMENTS

2004/0254820 A1 12/2004 Ishii
2018/0101955 A1* 4/2018 Varadarajan ............. G06T 7/73
2019/0294881 A1* 9/2019 Polak ...................... G06F 16/71
2021/0150198 A1 5/2021 Guam
2023/0063926 A1* 3/2023 Zhang .................... G06V 10/22
2023/0127086 A1 4/2023 Wakai et al.
(Continued)

FOREIGN PATENT DOCUMENTS

CN 113139483 A 7/2021
JP 2001-142521 A 5/2001
(Continued)

OTHER PUBLICATIONS

US Office Action for U.S. Appl. No. 18/203,342, mailed on Dec. 16, 2025.
(Continued)

*Primary Examiner* — Syed Haider
(74) *Attorney, Agent, or Firm* — Sughrue Mion, PLLC

(57) ABSTRACT

An information processing apparatus includes at least one processor, and the at least one processor carries out: a detection process of detecting a person and an object based on sensor information; a recognition process of recognizing an action of the person based on a relevance between the person and the object; a measurement process of measuring, based on a recognition result of the action, a time period for which the person has continued the action; and a generation process of generating information indicating a degree of divergence from an action plan based on (i) the time period for which the action has been continued and (ii) a time period which is included in the action plan and for which the action should be continued, the action plan being related to the action of the person which has been recognized.

10 Claims, 16 Drawing Sheets

(56) References Cited

U.S. PATENT DOCUMENTS

| | | | | |
|---|---|---|---|---|
| 2023/0394882 | A1 | 12/2023 | Higa et al. | |
| 2024/0281999 | A1 * | 8/2024 | Takamiya | G06V 40/103 |

FOREIGN PATENT DOCUMENTS

| | | | | |
|---|---|---|---|---|
| JP | 2003-015724 | A | 1/2003 | |
| JP | 2011-034234 | A | 2/2011 | |
| JP | 2013-117881 | A | 6/2013 | |
| JP | 2013-211034 | A | 10/2013 | |
| JP | 2015-225630 | A | 12/2015 | |
| JP | 2016-201074 | A | 12/2016 | |
| JP | 2017-068432 | A | 4/2017 | |
| JP | 2017-091175 | A | 5/2017 | |
| JP | 2017-162044 | A | 9/2017 | |
| JP | 2020-160734 | A | 10/2020 | |
| JP | 2020-194243 | A | 12/2020 | |
| JP | 2022-073569 | A | 5/2022 | |
| WO | WO-2018191555 | A1 * | 10/2018 | G06N 3/044 |
| WO | 2021/019657 | A1 | 2/2021 | |
| WO | 2022/009489 | A1 | 1/2022 | |

OTHER PUBLICATIONS

JP Office Action for JP Application No. 2022-091611, mailed on Jan. 20, 2026 with English Translation.

Takuya Kobayashi et al.; Recognition of Detailed Actions in Work Images of Production Lines; SS !! 2019 [USB], Image Sensing Technology Study Group, Dec. 31, 2019.

JP Office Action for JP Application No. 2022-091610, mailed on Jan. 20, 2026 with English Translation.

Tiancai Wang et al.; "Deep Contextual Attention for Human-Object Interaction Detection"; 2019 IEEE/CVF International Conference on Computer Vision (ICCV) [online], IEEE, Oct. 17, 2019, pp. 5693-5701.

JP Office Action for JP Application No. 2022-091611, mailed on Mar. 31, 2026 with English Translation.

* cited by examiner

| | | |
|---|---|---|
| PERSON FEATURE |  |  |
| OBJECT | HANDCART | — |
| ACTION | TRANSPORTATION | POINTING AND CALLING |

OBJECT INFORMATION (RECTANGLE NUMBER, OBJECT LABEL, POSITION INFORMATION)
1, PERSON, x11, y11, x12, y12, x13, y13, x14, y14
2, PERSON, x21, y21, x22, y22, x23, y23, x24, y24
3, PERSON, x31, y31, w1, h1
4, OBJECT, x41, y41, w2, h2
⋮

FIG. 16

| | |
|---|---|
| RECTANGLE NUMBER | 1 2 3 4 5 6 |
| GROUP NUMBER | 1 2 0 1 2 0 |

| | 1 | 2 | 3 | 4 | 5 | 6 |
|---|---|---|---|---|---|---|
| 1 | 0 | 0 | 0 | 1 | 0 | 0 |
| 2 | 0 | 0 | 0 | 0 | 1 | 0 |
| 3 | 0 | 0 | 0 | 0 | 0 | 0 |
| 4 | 1 | 0 | 0 | 0 | 0 | 0 |
| 5 | 0 | 1 | 0 | 0 | 0 | 0 |
| ⋮ | | | | | | |

FIG. 17

ACTION INFORMATION (ACTION LABEL, POSITION INFORMATION)
TRANSPORTATION, x71, y71, x72, y72, x73, y73, x74, y74
MONITORING, x81, y81, x82, y82, x83, y83, x84, y84
⋮

INFORMATION PROCESSING APPARATUS, INFORMATION PROCESSING METHOD, AND COMPUTER-READABLE NON-TRANSITORY STORAGE MEDIUM

This Nonprovisional application claims priority under 35 U.S.C. § 119 on Patent Application No. 2022-091611 filed in Japan on Jun. 6, 2022, the entire contents of which are hereby incorporated by reference.

TECHNICAL FIELD

The present invention relates to an information processing apparatus, an information processing method, and a computer-readable non-transitory storage medium.

BACKGROUND ART

A technique has been disclosed which measures, based on an image obtained by imaging a state where an operator is carrying out an operation, a time period for which the operator has carried out the operation.

Patent Literature 1 discloses an operation management apparatus that carries out an image analysis on an image in which an operator at the start of an operation appears and an image in which the operator at the end of the operation appears, and that measures an operation time taken for the operation related to a single operation project.

CITATION LIST

Patent Literature

[Patent Literature 1]

Japanese Patent Application Publication Tokukai No. 2015-225630

SUMMARY OF INVENTION

Technical Problem

For example, in a construction site, a plan of an operation is prepared in advance, and the operation is carried out according to the plan. However, in practice, there are cases where an operation is delayed from a plan or is ahead of a plan. Therefore, it is demanded to ascertain a deviation from a plan for an operation which has been actually carried out. However, it is difficult to ascertain a deviation of an operation from a plan even if an operation time of the operation carried out by an operator is measured using the technique disclosed in Patent Literature 1.

An example aspect of the present invention is accomplished in view of the problem, and its example object is to provide a technique capable of easily ascertaining a deviation from an action plan for an action which a person has carried out.

Solution to Problem

An information processing apparatus according to an example aspect of the present invention includes at least one processor, the at least one processor carrying out: a detection process of detecting a person and an object based on sensor information; a recognition process of recognizing an action of the person based on a relevance between the person and the object; a measurement process of measuring, based on a recognition result of the action, a time period for which the person has continued the action; and a generation process of generating information indicating a degree of divergence from an action plan based on (i) the time period which has been measured and for which the action has been continued and (ii) a time period which is included in the action plan planned for the action and for which the action should be continued, the action plan being related to the action of the person which has been recognized.

An information processing method in accordance with an example aspect of the present invention includes: detecting, by at least one processor, a person and an object based on sensor information; recognizing, by the at least one processor, an action of the person based on a relevance between the person and the object; measuring, by the at least one processor based on a recognition result of the action, a time period for which the person has continued the action; and generating, by the at least one processor, information indicating a degree of divergence from an action plan based on (i) the time period which has been measured and for which the action has been continued and (ii) a time period which is included in the action plan planned for the action and for which the action should be continued, the action plan being related to the action of the person which has been recognized.

A computer-readable non-transitory storage medium in accordance with an example aspect of the present invention stores a program for causing a computer to function as an information processing apparatus, the program causing the computer to carry out: a detection process of detecting a person and an object based on sensor information; a recognition process of recognizing an action of the person based on a relevance between the person and the object; a measurement process of measuring, based on a recognition result of the action, a time period for which the person has continued the action; and a generation process of generating information indicating a degree of divergence from an action plan based on (i) the time period which has been measured and for which the action has been continued and (ii) a time period which is included in the action plan planned for the action and for which the action should be continued, the action plan being related to the action of the person which has been recognized.

Advantageous Effects of Invention

According to an example aspect of the present invention, it is possible to easily ascertain a deviation from an action plan for an action which a person has carried out.

BRIEF DESCRIPTION OF DRAWINGS

FIG. 16 is a diagram illustrating an example of relevant information which is included in annotation information in a variation of the present invention.

FIG. 17 is a diagram illustrating another example of relevant information which is included in annotation information in a variation of the present invention.

EXAMPLE EMBODIMENTS

First Example Embodiment

Figure 1:
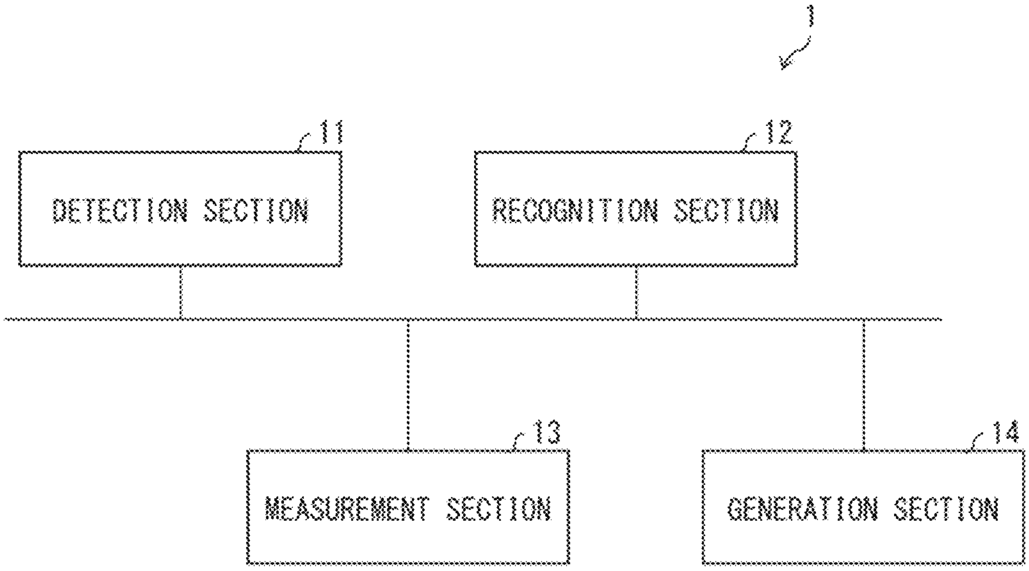
FIG. 1 is a block diagram illustrating a configuration of an information processing apparatus 1 according to a first example embodiment of the present invention.

The following description will discuss a first example embodiment of the present invention in detail with reference to the drawings. The present example embodiment is a basic form of example embodiments described later.

(Overview of Information Processing Apparatus 1)

An information processing apparatus 1 according to the present example embodiment detects a person and an object based on sensor information, recognizes an action of a person based on a relevance between the person and the object which have been detected, and measures, based on the recognition result, a time period for which the person has continued the action. Moreover, the information processing apparatus 1 is an apparatus that generates, based on the measured time period and a time period included in an action plan, information indicating a degree of divergence from the action plan related to the action of the person which has been recognized.

The term "sensor information" refers to information output from one or more sensors. Examples of the "sensor information" include: an image output from a camera; information which is output from light detection and ranging (Lidar) and which indicates a distance to a target object; a distance image based on output from a depth sensor; a temperature image based on output from an infrared sensor; position information output using a beacon; a first-person viewpoint image of a wearer output from a wearable camera; and audio data output from a microphone array constituted by a plurality of microphones.

A method in which the information processing apparatus 1 detects a person and an object based on sensor information is not limited, and a known method is used. Examples of a method in which the information processing apparatus 1 detects a person and an object based on sensor information include: a method based on feature quantities of an image of histograms of oriented gradients (HOG), color histograms, a shape, or the like; a method based on local feature quantities around feature points (e.g., scale-invariant feature transform (SIFT)); and a method using a machine learning model (e.g., faster regions with convolutional neural networks (R-CNN)).

In order to measure a time period for which a person has continued an action, the information processing apparatus 1 detects, at a plurality of points in time or in a predetermined time period, a person and an object which are identical with a person and an object, respectively, detected at a certain point in time. In other words, the information processing apparatus 1 detects a person and an object which are identical with a person and an object, respectively, detected based on a certain piece of sensor information based on another piece of sensor information which has been obtained at a timing different from that of the certain piece of sensor information. A method of determining whether or not a person and an object which have been detected by the information processing apparatus 1 based on a certain piece of sensor information are respectively identical with a person and an object which have been detected based on another piece of sensor information output from the sensor at a timing different from that of the certain piece of sensor information is not limited, and a known method is used.

Examples of the method of determining whether or not a person and an object detected by the information processing apparatus 1 based on a certain piece of sensor information are respectively identical with a person and an object detected based on another piece of sensor information output from the sensor at a timing different from that of the certain piece of sensor information include: a method based on a degree of overlap between a circumscribed rectangle of a person (or object) detected based on a certain piece of sensor information and a circumscribed rectangle of a person (or object) detected based on another piece of sensor information obtained at a timing different from that of the certain piece of sensor information; a method based on a degree of similarity between a feature inside a circumscribed rectangle of a person (or object) detected based on a certain piece of sensor information and a feature inside a circumscribed rectangle of the person (or object) detected based on another piece of sensor information obtained at a timing different from that of the certain piece of sensor information; and a method using a machine learning model (e.g., DeepSort).

The term "relevance between a person and an object" refers to what relationship exists between the person and the object. Examples of the "relevance between a person and an object" include a fact that a certain person is related to a certain object, and a fact that a certain person is not related to a certain object.

Examples of a method in which the information processing apparatus 1 recognizes an action of a person based on a relevance between the person and an object include a method of recognizing that, in a case where a relevance between a person and an object indicates a fact that the person is related to the object, the person is carrying out an action using the object. Another example of a method in which the information processing apparatus 1 recognizes an action of a person based on a relevance between the person and an object is a method of recognizing that, in a case where a relevance between a person and an object indicates a fact that the person is not related to the object, the person is carrying out an action without using the object. Thus, the action which the information processing apparatus 1 recognizes can include an action using an object and an action without using an object.

The "action plan" refers to information planned for an action and includes a time period for which the action should be continued. Examples of the "information indicating a degree of divergence from the action plan related to the action of the person which has been recognized" include information indicating a degree to which a time period for which an action of a person which has been recognized has been continued diverges from a time period which is included in an action plan and for which the action should be continued.

(Configuration of Information Processing Apparatus 1)

The following description will discuss a configuration of an information processing apparatus 1, with reference to FIG. 1. FIG. 1 is a block diagram illustrating a configuration of the information processing apparatus 1 according to the present example embodiment.

As illustrated in FIG. 1, the information processing apparatus 1 includes a detection section 11, a recognition section 12, a measurement section 13, and a generation section 14. The detection section 11, the recognition section 12, the measurement section 13, and the generation section 14 are configured to realize, in the present example embodiment, the detection means, the recognition means, the measurement means, and the generation means, respectively.

The detection section 11 detects a person and an object based on sensor information. A method in which the detection section 11 detects a person and an object based on sensor information is as described above. The detection section 11 supplies, to the recognition section 12, information indicating the detected person and object.

The recognition section 12 recognizes, based on a relevance between a person and an object which have been detected by the detection section 11, an action of the person. A method in which the recognition section 12 recognizes an action of a person based on a relevance between the person and an object is as described above. The recognition section 12 supplies a recognition result to the measurement section 13.

The measurement section 13 measures, based on an action recognition result by the recognition section 12, a time period for which the person has continued the action. The measurement section 13 supplies, to the generation section 14, a measurement result indicating the time period for which the person has continued the action.

The generation section 14 generates, based on (i) the time period which has been measured by the measurement section 13 and for which the action has been continued and (ii) a time period which is included in an action plan planned for the action and for which the action should be continued, information indicating a degree of divergence from the action plan related to the action of the person which has been recognized.

As described above, the information processing apparatus 1 according to the present example embodiment employs the configuration of including: the detection section 11 that detects a person and an object based on sensor information; the recognition section 12 that recognizes an action of the person based on a relevance between the person and the object; the measurement section 13 that measures, based on a recognition result of the action, a time period for which the person has continued the action; and the generation section 14 that generates information indicating a degree of divergence from an action plan based on (i) the time period which has been measured and for which the action has been continued and (ii) a time period which is included in the action plan planned for the action and for which the action should be continued, the action plan being related to the action of the person which has been recognized.

According to the information processing apparatus 1 of the present example embodiment, information is generated which indicates a degree of divergence between a time period for which a recognized action has been continued and a time period which is included in an action plan and for which the action should be continued. Therefore, it is possible to bring about an effect of easily ascertaining a deviation from the action plan for an action which a person has carried out.

(Flow of Information Processing Method S1)

Figure 2:
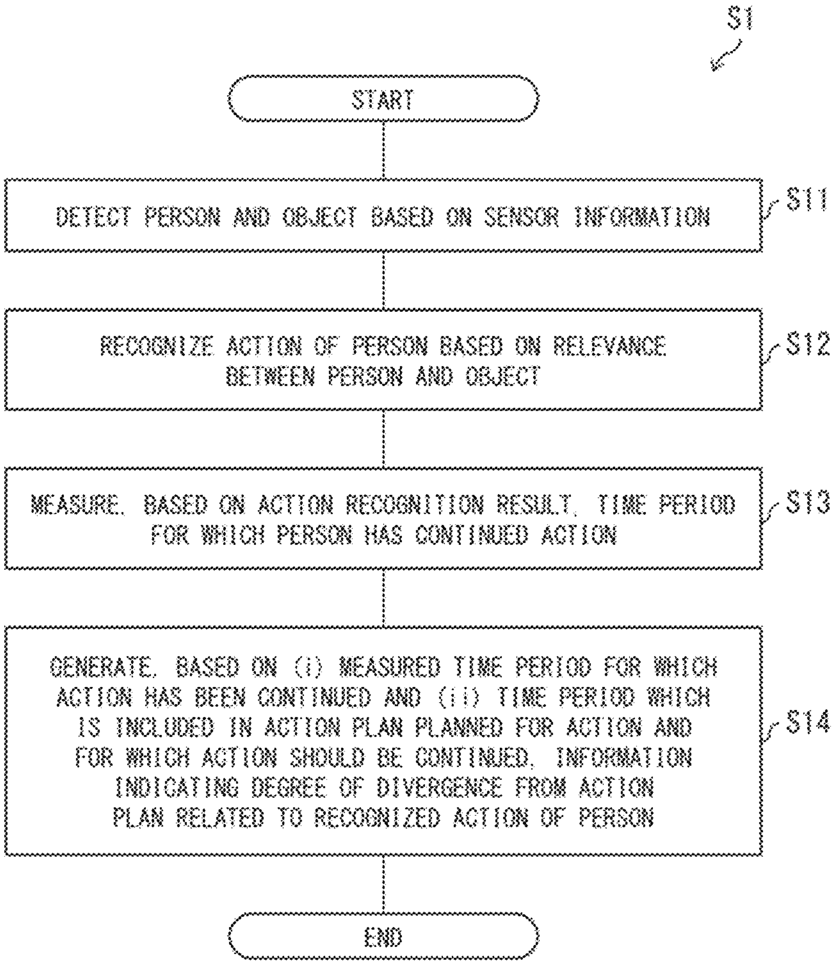
FIG. 2 is a flowchart illustrating a flow of an information processing method S1 according to the first example embodiment of the present invention.

The following description will discuss a flow of an information processing method S1 according to the present example embodiment with reference to FIG. 2. FIG. 2 is a flowchart illustrating the flow of the information processing method S1 according to the present example embodiment.

(Step S11)

In step S11, the detection section 11 detects a person and an object based on sensor information. The detection section 11 supplies, to the recognition section 12, information indicating the detected person and object.

(Step S12)

In step S12, the recognition section 12 recognizes, based on a relevance between the person and the object which have been detected by the detection section 11, an action of the person. The recognition section 12 supplies a recognition result to the measurement section 13.

(Step S13)

In step S13, the measurement section 13 measures, based on an action recognition result by the recognition section 12, a time period for which the person has continued the action. The measurement section 13 supplies, to the generation section 14, a measurement result indicating the time period for which the person has continued the action.

(Step S14)

In step 14, the generation section 14 generates, based on (i) the time period which has been measured by the measurement section 13 and for which the action has been continued and (ii) a time period which is included in an action plan planned for the action and for which the action should be continued, information indicating a degree of divergence from the action plan related to the action of the person which has been recognized.

As described above, the information processing method S1 according to the present example embodiment employs the configuration in which: the detection section 11 detects a person and an object based on sensor information; the recognition section 12 recognizes an action of the person based on a relevance between the person and the object; the measurement section 13 measures, based on a recognition result of the action, a time period for which the person has continued the action; and the generation section 14 generates information indicating a degree of divergence from an action plan based on (i) the time period which has been measured and for which the action has been continued and (ii) a time period which is included in the action plan planned for the action and for which the action should be continued, the action plan being related to the action of the person which has been recognized. Therefore, according to the information processing method S1 of the present example embodiment, an effect similar to that of the foregoing information processing apparatus 1 is brought about.

Second Example Embodiment

The following description will discuss a second example embodiment of the present invention in detail with reference to the drawings. The same reference numerals are given to constituent elements which have functions identical with those described in the first example embodiment, and descriptions as to such constituent elements are omitted as appropriate.

(Overview of Information Processing System 100)

Figure 3:
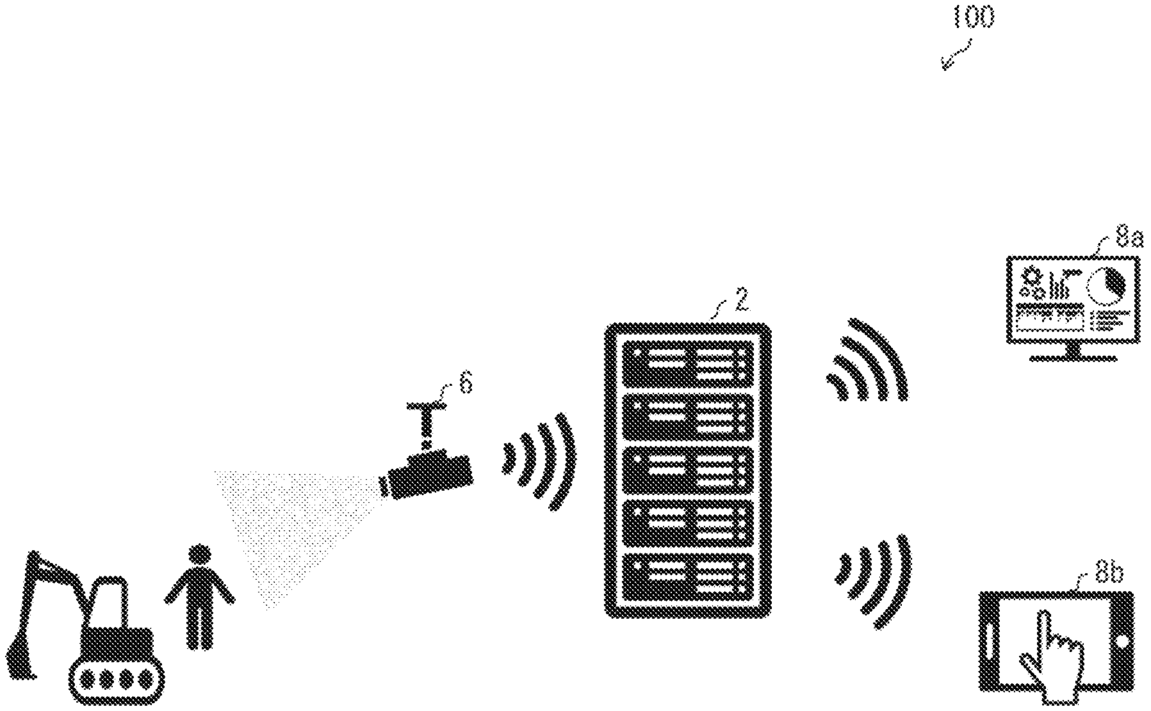
FIG. 3 is a schematic diagram illustrating an information processing system according to a second example embodiment of the present invention.

The following description will discuss an overview of an information processing system 100 according to the present example embodiment, with reference to FIG. 3. FIG. 3 is a schematic diagram illustrating the information processing system 100 according to the present example embodiment.

The information processing system 100 is a system that detects a person and an object based on sensor information, recognizes an action of the person based on a relevance between the person and the object which have been detected, and measures, based on the recognition result, a time period for which the person has continued the action. Moreover, the information processing system 100 is a system that generates, based on the measured time period and a time period included in an action plan, information indicating a degree of divergence from the action plan related to the action of the person which has been recognized.

For example, the information processing system 100 is configured to include an information processing apparatus 2, a camera 6, and a display apparatus 8, as illustrated in FIG. 3. In the information processing system 100, the information processing apparatus 2 acquires, as sensor information, an image output from the camera 6 that has imaged a construction site where a person carries out an action using a backhoe or the like. Hereinafter, an action which a person carries out at a construction site is referred to also as an "operation".

The information processing apparatus 2 detects a person and an object in the construction site based on the acquired image. The present example embodiment will discuss a case where a person is an operator, and an object is an operation object. The information processing apparatus 2 recognizes, based on a relevance between the detected operator and operation object, an operation which the operator is carrying out, and measures, based on the recognition result, a time period for which the operator has continued the operation.

The information processing apparatus 2 at least (i) displays the generated information indicating the degree of divergence on the information processing apparatus 2 or (ii) outputs the generated information indicating the degree of divergence to the display apparatus 8. Here, the display apparatus 8 is an apparatus that provides information to a user. Examples of the display apparatus 8 include an apparatus that displays an image. In the information processing system 100, for example, as illustrated in FIG. 3, the information processing apparatus 2 outputs information indicating a degree of divergence to at least one of a display apparatus 8*a* and a tablet 8*b*.

(Configuration of Information Processing System 100)

Figure 4:
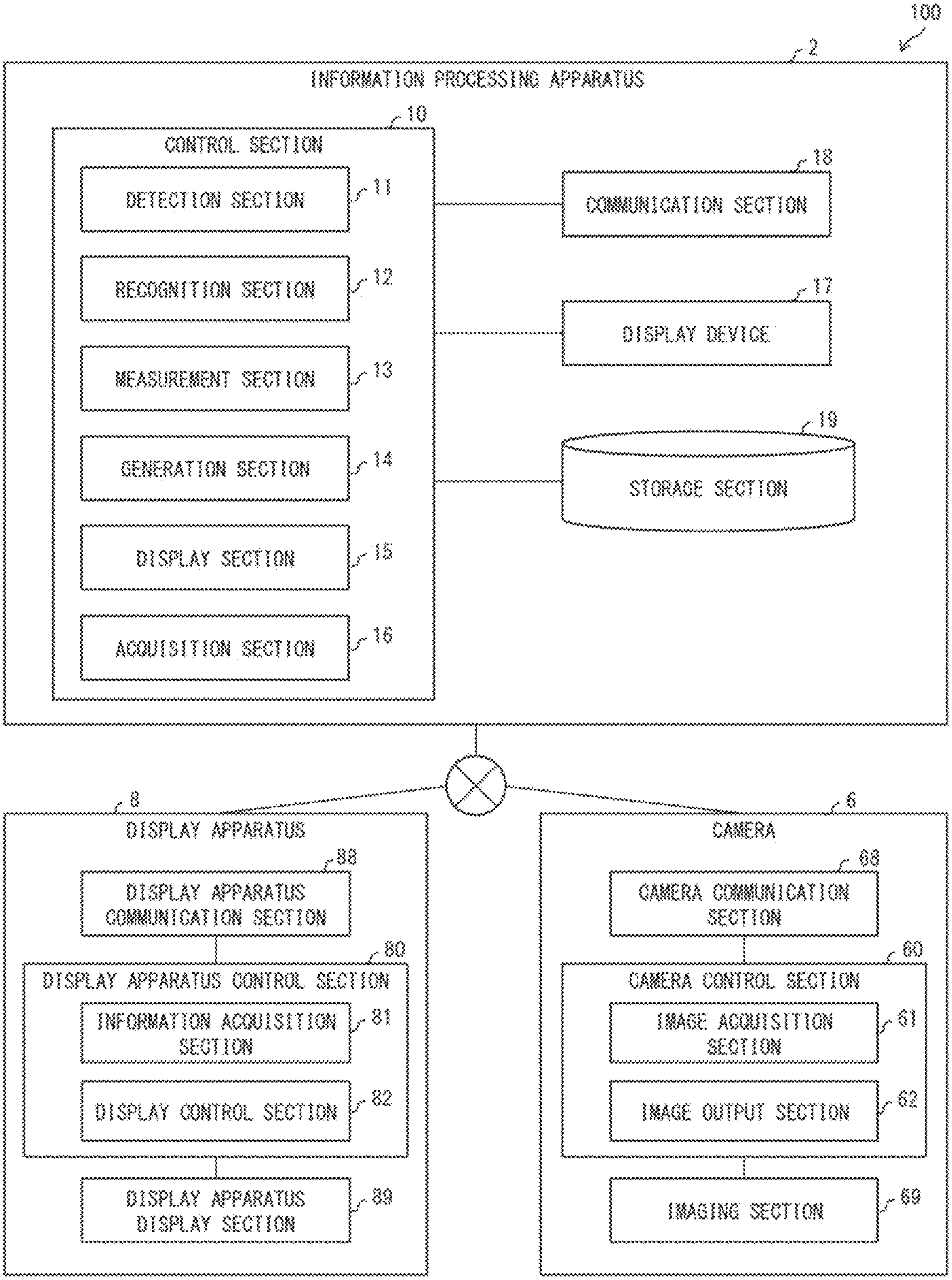
FIG. 4 is a block diagram illustrating a configuration of an information processing system according to the second example embodiment of the present invention.

The following description will discuss a configuration of an information processing system 100 according to the present example embodiment with reference to FIG. 4. FIG. 4 is a block diagram illustrating the configuration of the information processing system 100 according to the present example embodiment.

As illustrated in FIG. 4, the information processing system 100 is configured to include the information processing apparatus 2, the camera 6, and the display apparatus 8. The information processing apparatus 2, the camera 6, and the display apparatus 8 are communicably connected to each other via a network. A specific configuration of the network does not limited the present example embodiment but, as an example, it is possible to employ a wireless local area network (LAN), a wired LAN, a wide area network (WAN), a public network, a mobile data communication network, or a combination of these networks.

(Configuration of Information Processing Apparatus 2)

As illustrated in FIG. 4, the information processing apparatus 2 includes a control section 10, a display device 17, a communication section 18, and a storage section 19.

The display device 17 is a device that displays an image indicated by an image signal supplied from the control section 10.

The communication section 18 is a communication module that communicates with other apparatuses that are connected via the network. For example, the communication section 18 outputs data supplied from the control section 10 to the display apparatus 8, and supplies data output from the camera 6 to the control section 10.

The storage section 19 stores data which the control section 10 refers to. For example, the storage section 19 stores sensor information, an action plan, and action identification information (described later).

(Function of Control Section 10)

The control section 10 controls constituent elements included in the information processing apparatus 2. As illustrated in FIG. 4, the control section 10 includes a detection section 11, a recognition section 12, a measurement section 13, a generation section 14, a display section 15, and an acquisition section 16. The detection section 11, the recognition section 12, the measurement section 13, the generation section 14, and the display section 15 are configured to realize, in the present example embodiment, the detection means, the recognition means, the measurement means, the generation means, and the output means, respectively.

The detection section 11 detects an operator and an operation object based on sensor information. For example, the detection section 11 detects a plurality of persons (operators). A method in which the detection section 11 detects an operator and an operation object based on sensor information is as described above. The detection section 11 supplies, to the recognition section 12, information indicating the detected operator and operation object. An example of a process in which the detection section 11 detects an operator and an operation object will be described later.

The recognition section 12 recognizes, based on a relevance between an operator and an operation object which have been detected by the detection section 11, an action of the operator. For example, the recognition section 12 recognizes a plurality of actions based on a relevance between an operator and an operation object which have been detected by the detection section 11. In a case where the detection section 11 has detected a plurality of persons, the recognition section 12 recognizes an action for each of the plurality of persons. The operation which the recognition section 12 has recognized is an operation included in any of a plurality of processes. In other words, each of the plurality of operations recognized by the recognition section 12 is an operation included in any of the plurality of processes. An example of a method in which the recognition section 12 recognizes an action of an operator based on a relevance between the operator and an operation object will be described later. The recognition section 12 causes the storage section 19 to store a recognition result.

The measurement section 13 measures, based on an action recognition result by the recognition section 12, a time period for which the operator has continued the action. For example, in a case where a plurality of actions have been recognized by the recognition section 12, the measurement section 13 measures a time period for which each of the plurality of actions has been continued. In a case where an action has been recognized by the recognition section 12 for each of persons, the measurement section 13 measures, for each of the persons, a time period for which the action has been continued. The measurement section 13 supplies the measurement result to the display section 15. An example of a method in which the measurement section 13 measures a time period for which an operator has continued an action will be described later.

The generation section 14 generates, based on (i) the time period which has been measured by the measurement section 13 and for which the action has been continued and (ii) a time period which is included in an action plan planned for the action and for which the action should be continued, information indicating a degree of divergence from the action plan related to the action of the person which has been recognized. For example, in a case where a time period for which each of a plurality of actions has been continued has been measured by the measurement section 13, the generation section 14 generates information indicating a degree of divergence based on (i) the measured time period for which each of the plurality of actions has been continued and (ii) a time period which is included in an action plan planned for all of the plurality of actions and for which each of the plurality of actions should be continued. In a case where a time period for which an action has been continued has been measured for each of persons by the measurement section 13, the generation section 14 generates information indicating a degree of divergence for each of the persons. The generation section 14 supplies, to the display section 15, the generated information indicating the degree of divergence. An example of a method in which the generation section 14 calculates a degree of divergence will be described later.

The display section 15 displays information indicating a degree of divergence generated by the generation section 14. For example, the display section 15 displays information indicating the degree of divergence as an image via the display device 17. As another example, the display section 15 outputs information indicating a degree of divergence to the display apparatus 8 via the communication section 18 and displays the information as an image via the display apparatus 8. Examples of an image displayed by the display section 15 will be described later.

The acquisition section 16 acquires data supplied from the communication section 18. Examples of data acquired by the acquisition section 16 include an image output from the camera 6. The acquisition section 16 causes the storage section 19 to store the acquired data.

(Configuration of Camera 6)

As illustrated in FIG. 4, the camera 6 includes a camera control section 60, a camera communication section 68, and an imaging section 69.

The camera communication section 68 is a communication module that communicates with other apparatuses that are connected via the network. For example, the camera communication section 68 outputs data supplied from the camera control section 60 to the information processing apparatus 2.

The imaging section 69 is a device that images a subject included in an angle of view. For example, the imaging section 69 images a construction site where an operator and an operation object are included in the angle of view. The imaging section 69 supplies the captured image to the camera control section 60.

The camera control section 60 controls constituent elements included in the camera 6. As illustrated in FIG. 4, the camera control section 60 includes an image acquisition section 61 and an image output section 62.

The image acquisition section 61 acquires an image supplied from the imaging section 69. The image acquisition section 61 supplies the acquired image to the image output section 62.

The image output section 62 outputs data via the camera communication section 68. For example, the image output section 62 outputs an image supplied from the image acquisition section 61 to the information processing apparatus 2 via the camera communication section 68.

(Configuration of Display Apparatus 8)

As illustrated in FIG. 4, the display apparatus 8 includes a display apparatus control section 80, a display apparatus communication section 88, and a display apparatus display section 89.

The display apparatus communication section 88 is a communication module that communicates with other apparatuses that are connected via the network. For example, the display apparatus communication section 88 supplies data output from the information processing apparatus 2 to the display apparatus control section 80.

The display apparatus display section 89 is a device that displays an image indicated by an image signal. The display apparatus display section 89 displays an image indicated by an image signal supplied from the display apparatus control section 80.

The display apparatus control section 80 controls constituent elements included in the display apparatus 8. As illustrated in FIG. 4, the display apparatus control section 80 includes an information acquisition section 81 and a display control section 82.

The information acquisition section 81 acquires information indicating a degree of divergence supplied from the display apparatus communication section 88. The information acquisition section 81 supplies, to the display control section 82, the acquired information indicating the degree of divergence.

The display control section 82 supplies, as an image signal, the information indicating the degree of divergence supplied from the information acquisition section 81 to the display apparatus display section 89.

(Example of Process in which Detection Section 11 Tracks Operator)

As described in the first example embodiment, the detection section 11 detects a person and an object which are identical with a person and an object, respectively, detected based on a certain piece of sensor information based on another piece of sensor information which has been obtained at a timing different from that of the certain piece of sensor information. The following description will discuss a process example in which the detection section 11 detects, based on sensor information obtained at a timing different from that of a certain piece of sensor information, a person who is identical with a person detected based on the certain piece of sensor information.

First, the detection section 11 detects a person based on an image acquired at a time (t−1). Here, the detection section 11 assigns a detection ID (e.g., an operator ID described later) to the detected person for distinguishing the detected person from another person.

Next, the detection section 11 detects a person based on an image acquired at a time (t). Then, the detection section 11 determines whether or not the person who has been detected based on the image acquired at the time (t) is identical with the person who has been detected in the image acquired at the time (t−1) and to whom the detection ID has been assigned.

For example, the detection section 11 calculates a degree of overlap indicating a degree to which a circumscribed rectangle of the person who has been assigned with the detection ID overlaps a circumscribed rectangle of the person who has been detected based on the image acquired at the time (t). Examples of the degree of overlap of circumscribed rectangles include: a degree to which positions of two circumscribed rectangles overlap; a degree to which sizes of two circumscribed rectangles overlap; and a degree to which features of persons within two circumscribed rectangles overlap.

In a case where the detection section 11 has determined that the person detected based on the image acquired at the time (t) is identical with the person assigned with the detection ID, the detection section 11 assigns the detection ID which has been assigned to the person detected based on the image acquired at the time (t−1) to the person who has been detected in the image acquired at the time (t). With this configuration, the detection section 11 can track the same person among images acquired at different timings.

Example 1 of Method in which Recognition Section 12 Recognizes Action of Operator Examples of a method in which the recognition section 12 recognizes an action of an operator include a method in which the recognition section 12 recognizes an action of an operator based on a position of the operator and a position of an operation object.

For example, in a case where a distance between the position of the operator and the position of the operation object is equal to or less than a predetermined length, the recognition section 12 recognizes that the operator is carrying out an operation using the operation object. For example, in a case where a distance between a position of an operator and a position of a handcart is equal to or less than a predetermined length (e.g., 30 cm), the recognition section 12 recognizes that the operator is carrying out transportation, which is an operation using the handcart.

As another example, in a case where a position of an operator overlaps a position of an operation object, the recognition section 12 recognizes that the operator is carrying out an operation using the operation object. For example, in a case where a position of an operator overlaps a position of a backhoe, the recognition section 12 recognizes that the operator is carrying out excavation, which is an operation using the backhoe.

As described above, the recognition section 12 recognizes, based on the position of the operator and the position of the operation object, an action of the operator, and thus can accurately recognize the action by the operator using the operation object. Therefore, it is possible to recognize the action of the operator with higher accuracy.

Figure 5:
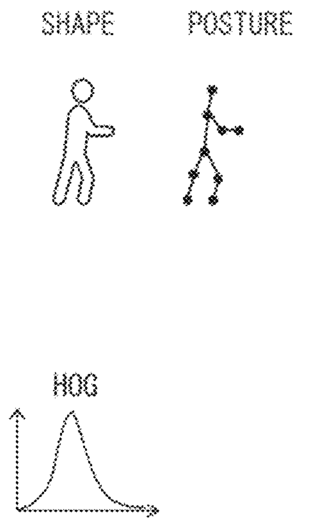
FIG. 5 is a diagram illustrating an example of action identification information according to the second example embodiment of the present invention.
Figure 5:
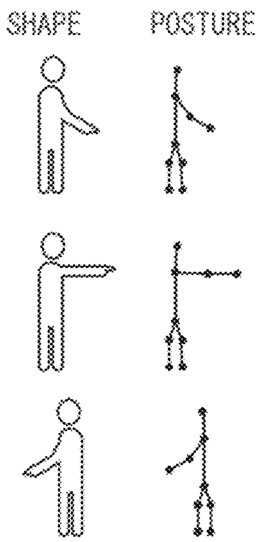

Example 2 of Method in which Recognition Section 12 Recognizes Action of Operator Another example of a method in which the recognition section 12 recognizes an action of an operator is a method in which the recognition section 12 refers to action identification information to recognize an action of an operator detected by the detection section 11. Here, the action identification information indicates a relevance between a feature of the operator in a predetermined action and a feature of an operation object related to the predetermined action. The following description will discuss action identification information with reference to FIG. 5. FIG. 5 is a diagram illustrating an example of action identification information according to the present example embodiment.

As illustrated in FIG. 5, the action identification information indicates a relevance between a person feature (a shape of a person, a posture of a person, and HOG in FIG. 5) in a predetermined action (“transportation” and “pointing and calling” in FIG. 5) and a feature of an object (“handcart” in FIG. 5) related to the predetermined action. The recognition section 12 determines whether or not a person feature of an operator and a feature of an operation object detected by the detection section 11 are identical with a person feature and a feature of an object in the action identification information.

In the action identification information, a plurality of “person features” may be associated with a predetermined action. For example, as illustrated in FIG. 5, in the action identification information, a shape of a person, a posture of a person, and HOG as the “person feature” may be associated with a predetermined action “transportation”.

As illustrated in FIG. 5, the action identification information may include a plurality of shapes of persons, a plurality of postures of persons, and a plurality of HOG in the “person feature”. For example, as illustrated in FIG. 5, in the action identification information, the predetermined action “pointing and calling” may be associated with, as the “person feature”, a shape of a person pointing downward on the right, a shape of a person pointing at a different angle (i.e., a shape of a person pointing in the horizontal direction on the right), and a shape of a person pointing in a different direction (i.e., a shape of a person pointing downward on the left).

Examples of the person feature in action identification information include a color and a local feature quantity, in addition to a shape of a person, a posture of a person, and HOG.

In a case where the person feature of the operator and the feature of the operation object detected by the detection section 11 are identical with the person feature and the feature of the object in the action identification information, the recognition section 12 recognizes that an action associated with the person feature and the feature of the object in the action identification information is an operation which the operator is carrying out.

Meanwhile, in a case where the person feature of the operator and the feature of the operation object detected by the detection section 11 are not identical with the person feature and the feature of the object in the action identification information, the recognition section 12 recognizes that an operation of the operator is an unidentified action, which indicates that the operation could not be identified. In other words, in a case where an action of the operator is not any of a plurality of predetermined actions, the recognition section 12 recognizes that the action of the operator is an unidentified action.

As illustrated in FIG. 5, the action identification information includes: an action (such as the action "transportation") which is associated with an object "handcart"; and an action (such as the action "pointing and calling") which is not associated with an object. In other words, an action which the recognition section 12 recognizes includes an action using an object and an action without using an object.

As described above, the recognition section 12 refers to action identification information that indicates a relevance between a feature of an operator in a predetermined action and a feature of an operation object related to the predetermined action, and recognizes an action of the operator detected by the detection section 11. Thus, the recognition section 12 can recognize an action of the operator with higher accuracy.

Moreover, with this configuration, the recognition section 12 can recognize, with higher accuracy, an action of an operator even in a case where the operator carries out an action without using an object.

Example 3 of Method in which Recognition Section 12 Recognizes Action of Operator As yet another example of a method in which the recognition section 12 recognizes an action of an operator, there is a method of recognizing an action of an operator based on, in addition to the operator and an operation object, an environment surrounding the operator or the operation object.

For example, in a case where the recognition section 12 has recognized that concrete exists in addition to an operator and an operation object as an environment surrounding the operator or the operation object, the recognition section 12 recognizes that the operator is carrying out an operation of "leveling concrete".

As described above, the recognition section 12 recognizes an action of an operator based on, in addition to an operator and an operation object, an environment surrounding the operator or the operation object. Thus, the recognition section 12 can recognize, with higher accuracy, an action of the operator.

Example 4 of Method in which Recognition Section 12 Recognizes Action of Operator As a still another example of a method in which the recognition section 12 recognizes an action of an operator, in a case where operation objects which have been detected by the detection section 11 based on pieces of sensor information respectively acquired from a plurality of sensors vary depending on the pieces of sensor information, the recognition section 12 may recognize an action of an operator based on an operation object determined based on a majority decision.

For example, in a case where an object which has been detected based on sensor information output from a sensor 1 is an object 1, an object which has been detected based on sensor information output from a sensor 2 is an object 2, and an object which has been detected based on sensor information output from a sensor 3 is the object 1, the recognition section 12 recognizes, based on the object 1, an action of a person.

Thus, in a case where the detection section 11 has acquired pieces of sensor information respectively from the plurality of sensors, the recognition section 12 recognizes an action of an operator based on an operation object determined based on a majority decision. Therefore, it is possible to reduce erroneous recognition.

Example 1 of Method in which Measurement Section 13 Measures Time Period

Figure 6:
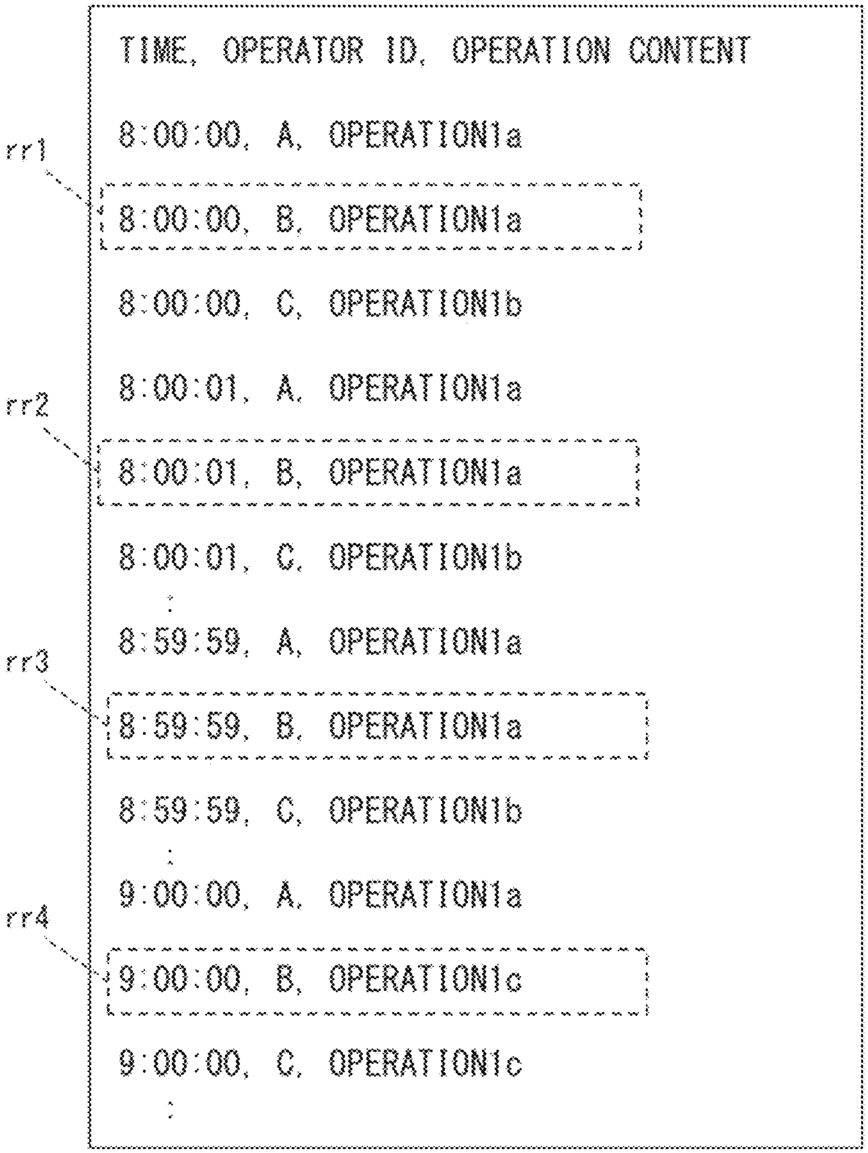
FIG. 6 is a diagram illustrating an example of a table indicating recognition results according to the second example embodiment of the present invention.

The following description will discuss an example of a method in which the measurement section 13 measures a time period for which an operator has continued an operation, with reference to FIG. 6. FIG. 6 is a diagram illustrating an example of a table indicating recognition results according to the present example embodiment.

First, the recognition section 12 causes the storage section 19 to store, as a recognition result, a time of recognition, an operator ID for distinguishing a recognized operator from another operator, and operation content in association with each other. In this configuration, as illustrated in FIG. 6, the storage section 19 stores a plurality of recognition results in each of which a time, an operator ID, and operation content are associated with each other. The table illustrated in FIG. 6 is a table obtained in a case where the recognition section 12 recognized operation content every second.

The measurement section 13 measures, with reference to the table illustrated in FIG. 6, a time period for which an operator has continued an operation. For example, in a case of measuring a time period for which an operator with an operator ID of "B" has continued operation content "operation 1*a*", the measurement section 13 extracts recognition results rr1 through rr4 in which the operator ID is "B". Next, the measurement section 13 extracts, from the recognition results rr1 through rr4, a time "8:00:00" at which the operation content "operation 1*a*" was recognized for the first time. Furthermore, the measurement section 13 extracts, from the recognition results rr1 through rr4, a time "9:00:00" at which an operation other than the operation content "operation 1*a*" was recognized for the first time. Then, the measurement section 13 obtains a difference "1 hour" between the extracted times "8:00:00" and "9:00:00" as a time period for which the operator with the operator ID of "B" has continued the operation content "operation 1*a*".

In a case where the same operation content has been intermittently recognized on a time axis by the recognition section 12, the measurement section 13 may measure, as a time period for which a certain operation has been continued, a sum of time periods for which a certain operator has continued the certain operation. For example, the following description assumes a case where an operator with an operator ID of "A" has continued an operation of operation content "operation 1*a*" for 3 hours, and then has continued an operation of operation content "operation 1*b*" for 2 hours, and then has continued the operation of operation content "operation 1*a*" again for another 1 hour. In this case, the measurement section 13 measures that a time period for which the operator with the operator ID of "A" has continued the operation of operation content "operation 1*a*" is 3 hours+1 hour=4 hours.

The measurement section 13 may measure, as a time period for which a certain operator has continued a certain operation, a value calculated by multiplying the number of times of recognition of a certain operation carried out by the certain operator by a time interval at which the recognition section 12 carries out the recognition process. For example, in a case of measuring a time period for which an operator with an operator ID of "B" has continued operation content "operation 1*a*", the measurement section 13 extracts recognition results in which the operator ID is "B" in the table illustrated in FIG. 6. Here, the recognition process is carried out at intervals of one second. Therefore, recognition results which are extracted are 3601 results during a period from rr1 (time of 8:00:00) to rr4 (9:00:00). Next, the measurement section 13 calculates, from among the results, the number of pieces "3600" of recognition results associated with the operation content "operation 1*a*". Then, the measurement section 13 multiplies the number of pieces "3600" by the time interval "1 second" at which the recognition section 12 carries out the recognition process.

Thus, the measurement section 13 measures that a time period for which the operator with the operator ID of "B" has continued the operation of the operation content "operation 1*a*" is 1 hour. By thus carrying out the method of "multiplying the number of times of recognizing that a certain operator has carried out a certain operation by a time interval of the recognition process", it is possible to measure a time period for which the certain operation has been carried out, regardless of whether or not recognition results of the same operation content by a certain operator are intermittent on the time axis.

Figure 7:
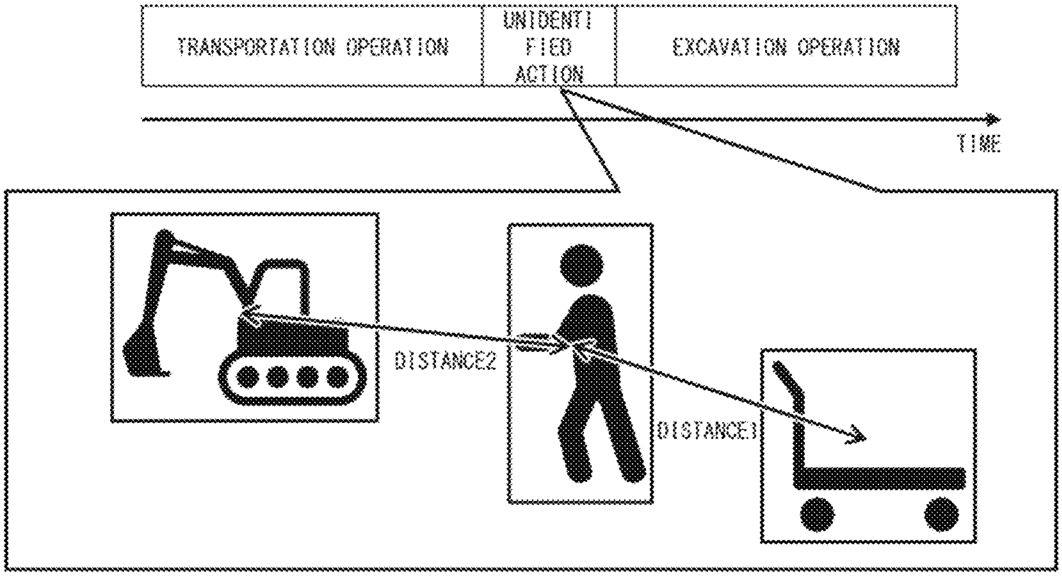
FIG. 7 is a diagram illustrating an example of a method in which a measurement section according to the second example embodiment of the present invention measures a time period in a case where an unidentified action has been recognized.

Example 2 of Method in which Measurement Section 13 Measures Time Period The following description will discuss an example of a method in which the measurement section 13 measures, in a case where an action of an operator recognized by the recognition section 12 is an unidentified action, a time period for which the operator has continued the operation, with reference to FIG. 7. FIG. 7 is a diagram illustrating an example of a method in which the measurement section 13 according to the present example embodiment measures a time period in a case where an unidentified action has been recognized.

An example of a case where an action of an operator recognized by the recognition section 12 is an unidentified action includes an action which is carried out when the operator shifts from a certain operation to another operation. In this case, the measurement section 13 may regard the unidentified action as an operation which the operator has carried out immediately before the unidentified action, or may regard the unidentified action as an operation which the operator has carried out immediately after the unidentified action. The measurement section 13 may regard or determine the unidentified action as one of (i) an operation carried out immediately before the unidentified action and (ii) an operation carried out immediately after the unidentified action, based on a positional relation between an operation object and an operator associated with each of the operation carried out immediately before the unidentified action and the operation carried out immediately after the unidentified action. That is, the measurement section 13 may carry out measurement by adding a time period for which the unidentified action has been continued to a time period for which the operator has continued another action different from the unidentified action.

For example, the following description will discuss a configuration in which the measurement section 13 measures, based on a distance between an operator and an operation object, a time period for which the operator has continued an operation, with reference to FIG. 7. The image illustrated in FIG. 7, which includes an operator and an operation object, is an image indicating a state where the operator carries out a transportation operation using a handcart and then shifts to an excavation operation using a backhoe. In the image illustrated in FIG. 7, the operator is not related to the handcart and is also not related to the backhoe. Therefore, the action is recognized by the recognition section 12 as an unidentified action. In this case, first, the measurement section 13 calculates a distance between the operator and the operation object.

Examples of a method in which the measurement section 13 calculates a distance between an operator and an operation object include, as illustrated in FIG. 7, a method of calculating a distance between a center of a circumscribed rectangle of the operator and a center of a circumscribed rectangle of the operation object. Assuming that a distance between a center of a circumscribed rectangle of the operator and a center of a circumscribed rectangle of the handcart is a distance 1, and a distance between the center of the circumscribed rectangle of the operator and a center of a circumscribed rectangle of the backhoe is a distance 2, the measurement section 13 measures a time period while regarding, as the transportation operation, a period in which a length of the distance 2 is greater than a length of the distance 1 among a period of the unidentified action. Meanwhile, the measurement section 13 measures a time period while regarding, as the excavation operation, a period in which the length of the distance 2 is not more than the length of the distance 1 among the period of the unidentified action.

As described above, the measurement section 13 carries out measurement by adding a time period for which the unidentified action has been continued to a time period for which the operator has continued another action different from the unidentified action. Thus, even in a case where there is a period in which an action of the operator could not be recognized, the measurement section 13 can carry out measurement while regarding such a period as a period of any action. Therefore, it is possible to ascertain, with higher accuracy, a time period for which a person has continued an action.

(Example of Method in which Generation Section 14 Calculates Degree of Divergence)

Figure 8:
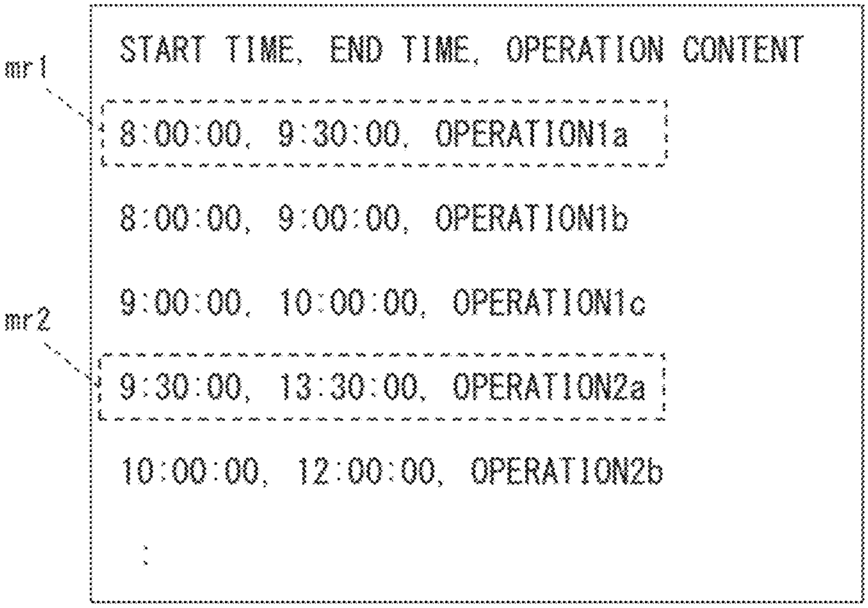
FIG. 8 is a diagram illustrating an example of a measurement result and an example of a time period which is included in an operation plan and for which an operation should be continued, according to the second example embodiment of the present invention.
Figure 8:
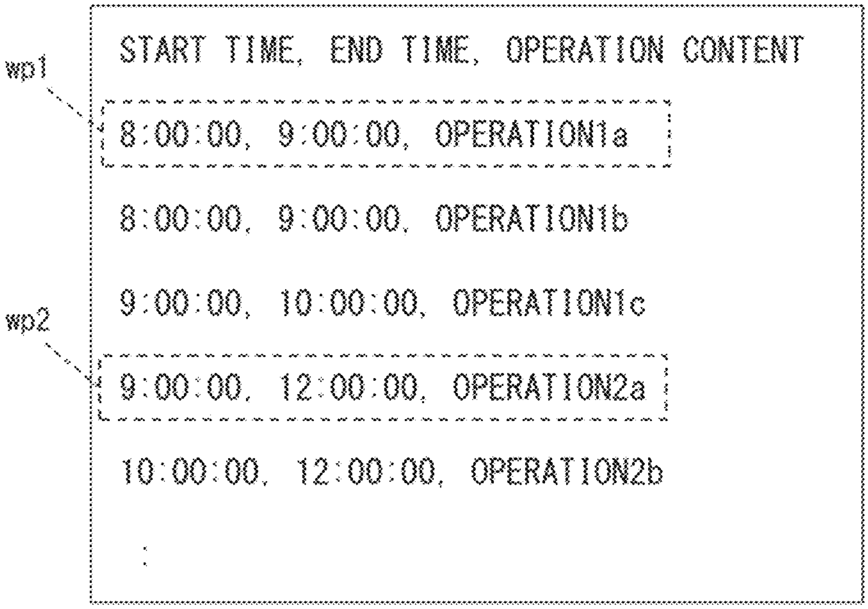

The following description will discuss an example of a method in which the generation section 14 calculates a degree of divergence, with reference to FIG. 8. FIG. 8 is a diagram illustrating an example of a measurement result and an example of a time period which is included in an operation plan and for which an operation should be continued, according to the present example embodiment.

The upper part of FIG. 8 indicates an example of measurement results obtained by the measurement section 13. As illustrated in the upper part of FIG. 8, in the measurement result, a start time indicating a time at which an operation was started, an end time indicating a time at which the operation was ended, and operation content are associated with each other. For example, a measurement result mr1 indicates that operation content "operation 1*a*" has been carried out during a period between "8:00:00" and "9:30:00".

The lower part of FIG. 8 indicates an example of a time period which is included in an operation plan and for which an operation should be continued. As illustrated in the lower part of FIG. 8, in the operation plan, a start time indicating a time at which an operation should be started, an end time indicating a time at which the operation should be ended, and operation content are associated with each other. For example, an operation plan wp1 indicates that operation content "operation 1*a*" should be carried out during a period between "8:00:00" and "9:00:00".

The generation section 14 calculates a degree of divergence with reference to the diagram illustrated in FIG. 8. For example, the generation section 14 calculates, as a degree of divergence, a difference between (i) an operation time in a measurement result obtained by the measurement section 13 and (ii) a time period which is included in the operation plan and for which an operation should be continued.

For example, in a case of calculating a degree of divergence of operation content "operation 1*a*", the generation section 14 extracts (i) a measurement result mr1 including the operation content "operation 1*a*" in the upper part of FIG. 8 and (ii) an operation plan wp1 including the operation content "operation 1*a*" in the lower part of FIG. 8. Then, the generation section 14 calculates, as a degree of divergence, a difference "30 minutes" between (i) an operation time (which is 1 hour and 30 minutes between "8:00:00" and "9:30:00") in the measurement result mr1 and (ii) an operation time (which is 1 hour between "8:00:00" and "9:00:00") in the operation plan wp1.

As another example, the generation section 14 calculates, as a degree of divergence, a ratio of an operation time period in the measurement result obtained by the measurement section 13 to a time period which is included in the operation plan and for which the operation should be continued.

For example, in a case of calculating a degree of divergence of operation content "operation 2*a*", the generation section 14 extracts (i) a measurement result mr2 including the operation content "operation 2*a*" in the upper part of FIG. 8 and (ii) an operation plan wp2 including the operation content "operation 2*a*" in the lower part of FIG. 8. Then, the generation section 14 calculates, as a degree of divergence, a ratio "133%" of an operation time (which is 4 hours between "9:30:00" and "13:30:00") in the measurement result mr2 to an operation time (which is 3 hours between "9:00:00" and "12:00:00") in the operation plan wp2.

Example 1 of Image Indicating Degree of Divergence

Figure 9:
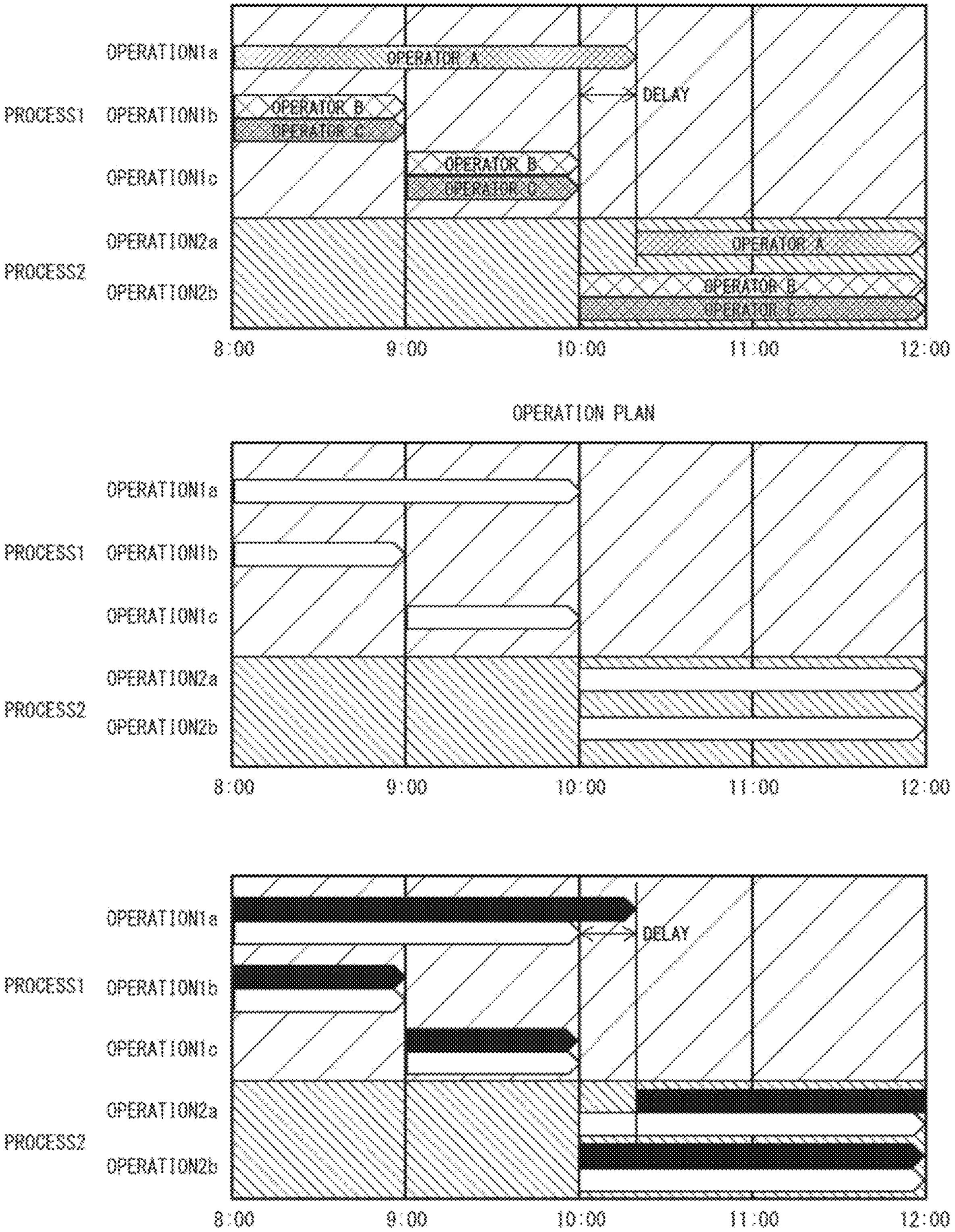
FIG. 9 is a diagram illustrating an example of an image indicating measurement results, an example of an image indicating an operation plan, and an example of an image indicating a degree of divergence, according to the second example embodiment of the present invention.

The following description will discuss an example of an image which indicates a degree of divergence and which is displayed by the display section 15, with reference to FIG. 9. FIG. 9 is a diagram illustrating an example of an image indicating measurement results, an example of an image indicating an operation plan, and an example of an image indicating a degree of divergence, according to the present example embodiment.

The image illustrated in the upper part of FIG. 9 is an example of an image indicating a measurement result obtained by the measurement section 13. The measurement results illustrated in the upper part of FIG. 9 include operation content, a process including the operation content, an operator who has carried out the operation, a time at which the operation was started, and a time at which the operation was ended. For example, the image illustrated in the upper part of FIG. 9 indicates that operation content "operation 1*a*" included in a process "process 1" has been carried out by an operator "operator A" during a period between "8:00:00" and "10:15:00".

The image illustrated in the middle part of FIG. 9 is an example of an image indicating an operation plan. As illustrated in the middle part of FIG. 9, the operation plan includes operation content, a process including the operation content, a time at which the operation should be started, and a time at which the operation should be ended. For example, the image illustrated in the middle part of FIG. 9 indicates that operation content "operation 1*a*" included in a process "process 1" should be carried out during a period between "8:00:00" and "10:00:00".

In a case where the image indicating the measurement result obtained by the measurement section 13 is the image indicated in the upper part of FIG. 9 and the operation plan is the image indicated in the middle part of FIG. 9, for example, the generation section 14 calculates a degree of divergence "15 minutes" of the "operation 1*a*" included in the "process 1". Then, the generation section 14 supplies, to the display section 15, information indicating the degree of divergence.

The display section 15 displays the degree of divergence with reference to the information which has been generated by the generation section 14 and which indicates the degree of divergence. For example, an image illustrated in the lower part of FIG. 9 is displayed. The image displayed by the display section 15, which is illustrated in the lower part of FIG. 9, includes measurement results obtained by the measurement section 13 and an operation plan. The image illustrated in the lower part of FIG. 9 indicates that, as the degree of divergence, operation content "operation 1*a*" included in a process "process 1" is delayed by "15 minutes".

In a case where the generation section 14 has generated information indicating a degree of divergence for each process, the display section 15 displays an image indicating the degree of divergence for each process, as illustrated in the lower part of FIG. 9. In the image illustrated in the lower part of FIG. 9, the display section 15 displays a degree of divergence between a measurement result obtained by the measurement section 13 and an operation plan for each of a process "process 1" and a process "process 2". The image illustrated in the lower part of FIG. 9 indicates that the process "process 1" is delayed. As described above, the information processing apparatus 2 can easily ascertain, for each process, a deviation from an operation plan for an operation carried out by the operator.

In a case where the generation section 14 has generated information indicating a degree of divergence for each operation, the display section 15 displays an image indicating the degree of divergence for each period, as illustrated in the lower part of FIG. 9. In the image illustrated in the lower part of FIG. 9, the display section 15 displays a degree of divergence between a measurement result obtained by the measurement section 13 and an operation plan for each of operation content "operation 1*a*", "operation 1*b*", "operation 1*c*", "operation 2*a*", and "operation 2*b*". The image illustrated in the lower part of FIG. 9 indicates that operation content "operation 1*a*" is delayed. As described above, the information processing apparatus 2 can easily ascertain, for each operation, a deviation from an operation plan for an operation carried out by the operator.

Thus, the display section 15 displays information indicating the degree of divergence. Therefore, the display section 15 can notify a user whether or not an operation of a person is as described in an action plan. The display section 15 displays a time period which is included in the action plan and for which the action should be continued. Therefore, the display section 15 can suitably notify a user whether or not an operation of a person is as described in an action plan.

Example 2 of Image Indicating Degree of Divergence

Figure 10:
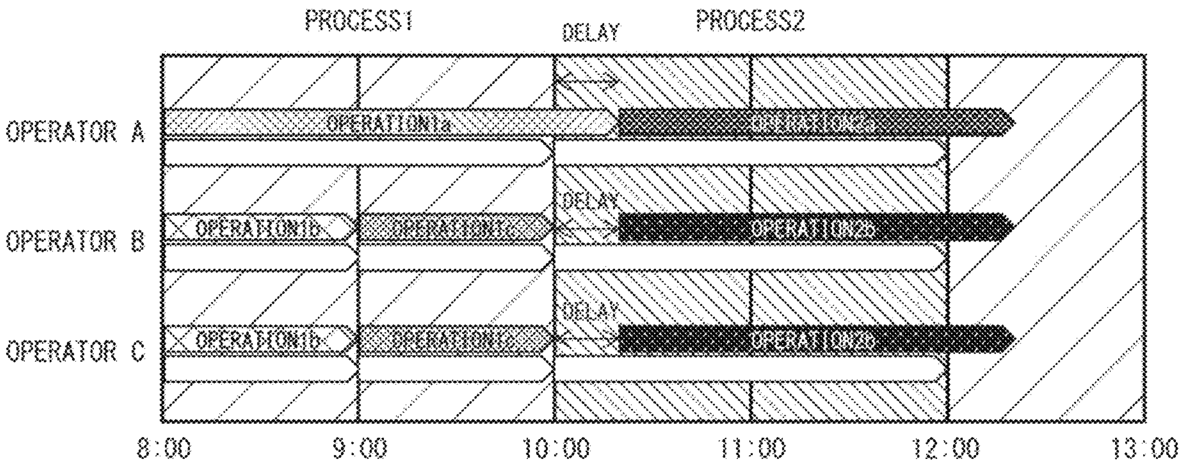
FIG. 10 is a diagram illustrating another example of an image indicating a degree of divergence according to the second example embodiment of the present invention.

The following description will discuss another example of an image which indicates a degree of divergence and which is displayed by the display section 15, with reference to FIG. 10. FIG. 10 is a diagram illustrating another example of an image indicating a degree of divergence according to the present example embodiment.

In a case where the generation section 14 has generated information indicating a degree of divergence for each operator, the display section 15 may display an image indicating the degree of divergence for each operator, as illustrated in FIG. 10.

In the image illustrated in FIG. 10, the display section 15 displays a degree of divergence between a measurement result obtained by the measurement section 13 and an operation plan for each of operators "operator A", "operator B", and "operator C". The image illustrated in FIG. 10 indicates that an operation by the operator "operator A" is delayed. As described above, the information processing apparatus 2 can easily ascertain, for each operator, a deviation from an operation plan for an operation carried out by the operator.

In the image illustrated in FIG. 10, the display section 15 indicates that operations of the operators "operator B" and "operator C" are also delayed due to the delay of the operation "operation 1*a*" of the operator "operator A". Therefore, the display section 15 can notify a user which operator (or which operation) causes a delay in the operation.

Example 3 of Image Indicating Degree of Divergence

Figure 11:
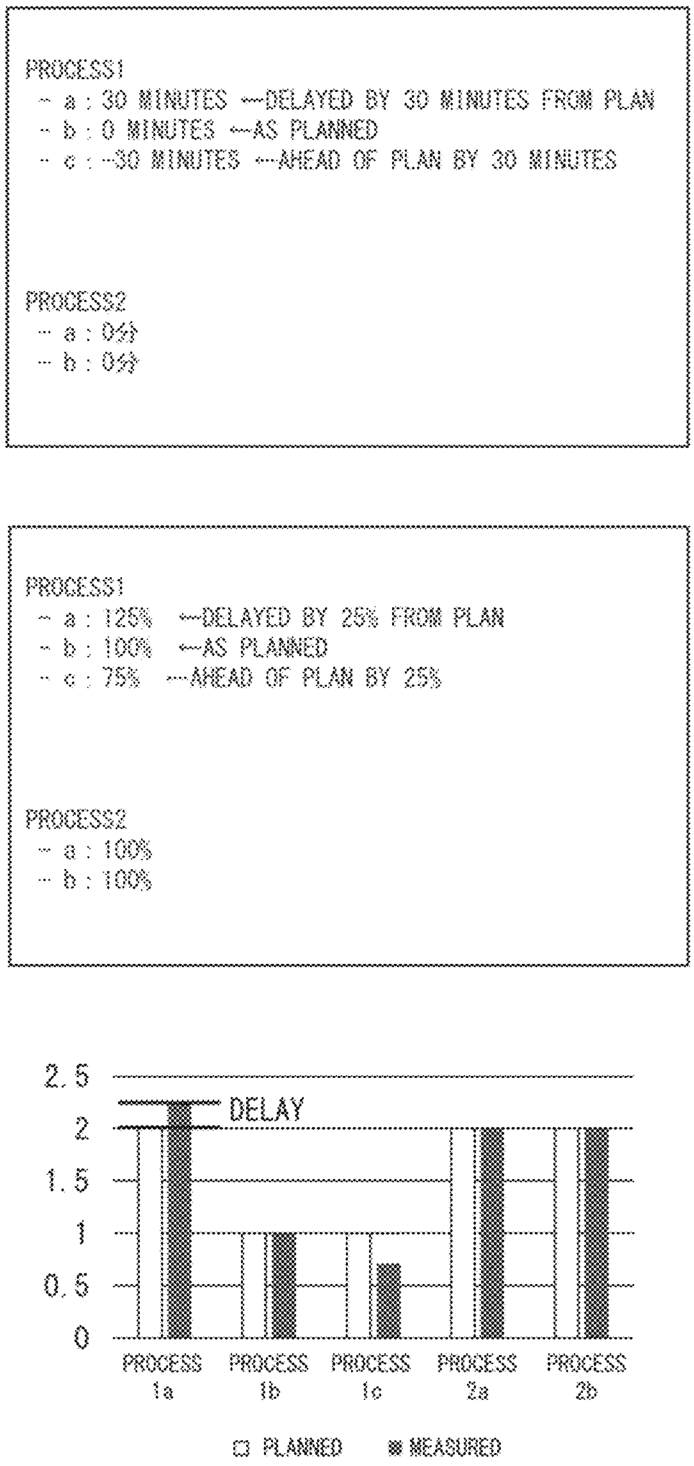
FIG. 11 is a diagram illustrating another example of an image indicating a degree of divergence according to the second example embodiment of the present invention.

The following description will discuss another example of an image which indicates a degree of divergence and which is displayed by the display section 15, with reference to FIG. 11. FIG. 11 is a diagram illustrating another example of an image indicating a degree of divergence according to the present example embodiment.

The display section 15 may display a degree of divergence by text. In the image illustrated in the upper part of FIG. 11, the display section 15 displays, by text, a degree of divergence "30 minutes" of a process "process 1*a*". Furthermore, the display section 15 displays an image further including text "delayed by 30 minutes from the plan" indicating that the degree of divergence "30 minutes" indicates that the operation is delayed by 30 minutes from the operation plan.

Similarly, in the image illustrated in the upper part of FIG. 11, the display section 15 displays an image including (i) a degree of divergence "−30 minutes" of the process "process 1*c*" and (ii) text "ahead of the plan by 30 minutes" indicating that the degree of divergence "−30 minutes" indicates that the operation is ahead of the operation plan by 30 minutes.

In a case where the generation section 14 has calculated, as a degree of divergence, a ratio of an operation period in a measurement result obtained by the measurement section 13 to a time period which is included in the operation plan and for which the operation should be continued, the display section 15 may display, as the degree of divergence, the ratio by text. In the image illustrated in the middle part of FIG. 11, the display section 15 displays, by text, a degree of divergence "125%" of the process "process 1*a*". Furthermore, the display section 15 displays an image further including text "delayed by 25% from the plan" indicating that the degree of divergence "125%" indicates that the operation is delayed by 25% from the operation plan.

Similarly, in the image illustrated in the middle part of FIG. 11, the display section 15 displays an image including (i) a degree of divergence "75%" of the process "the process 1*c*" and (ii) text "ahead of the plan by 25%" indicating that the degree of divergence "75%" indicates that the operation is ahead of the operation plan by 25%.

Alternatively, the display section 15 may display a degree of divergence by a graph. In the image illustrated in the lower part of FIG. 11, the display section 15 displays, for each process, a measurement time and a time period which is included in the operation plan and for which the operation should be continued, using a bar graph. In the image illustrated in the lower part of FIG. 11, for example, the display section 15 indicates that, in the process "process 1*a*", a measured time period is longer by "15 minutes" than a time period which is included in the operation plan and for which the operation should be continued, and therefore the operation is delayed by "15 minutes" from the operation plan.

(Effect of Information Processing Apparatus 2)

The information processing apparatus 2 employs the configuration of including: the detection section 11 that detects an operator and an operation object based on an image; the recognition section 12 that recognizes an operation of the operator based on a relevance between the operator and the operation object; the measurement section 13 that measures, based on a recognition result of the operation, a time period for which the operator has continued the operation; and the generation section 14 that generates information indicating a degree of divergence from an operation plan based on (i) the time period which has been measured and for which the operation has been continued and (ii) a time period which is included in the operation plan planned for the operation and for which the operation should be continued, the operation plan being related to the operation of the person which has been recognized.

According to the information processing apparatus 2 of the present example embodiment, information is generated which indicates a degree of divergence between a time period for which a recognized operation has been continued and a time period which is included in an operation plan and for which the operation should be continued. Therefore, it is possible to bring about an effect of easily ascertaining a deviation from the operation plan for an operation which an operator has carried out.

(Variation of Display Section 15)

Figure 12:
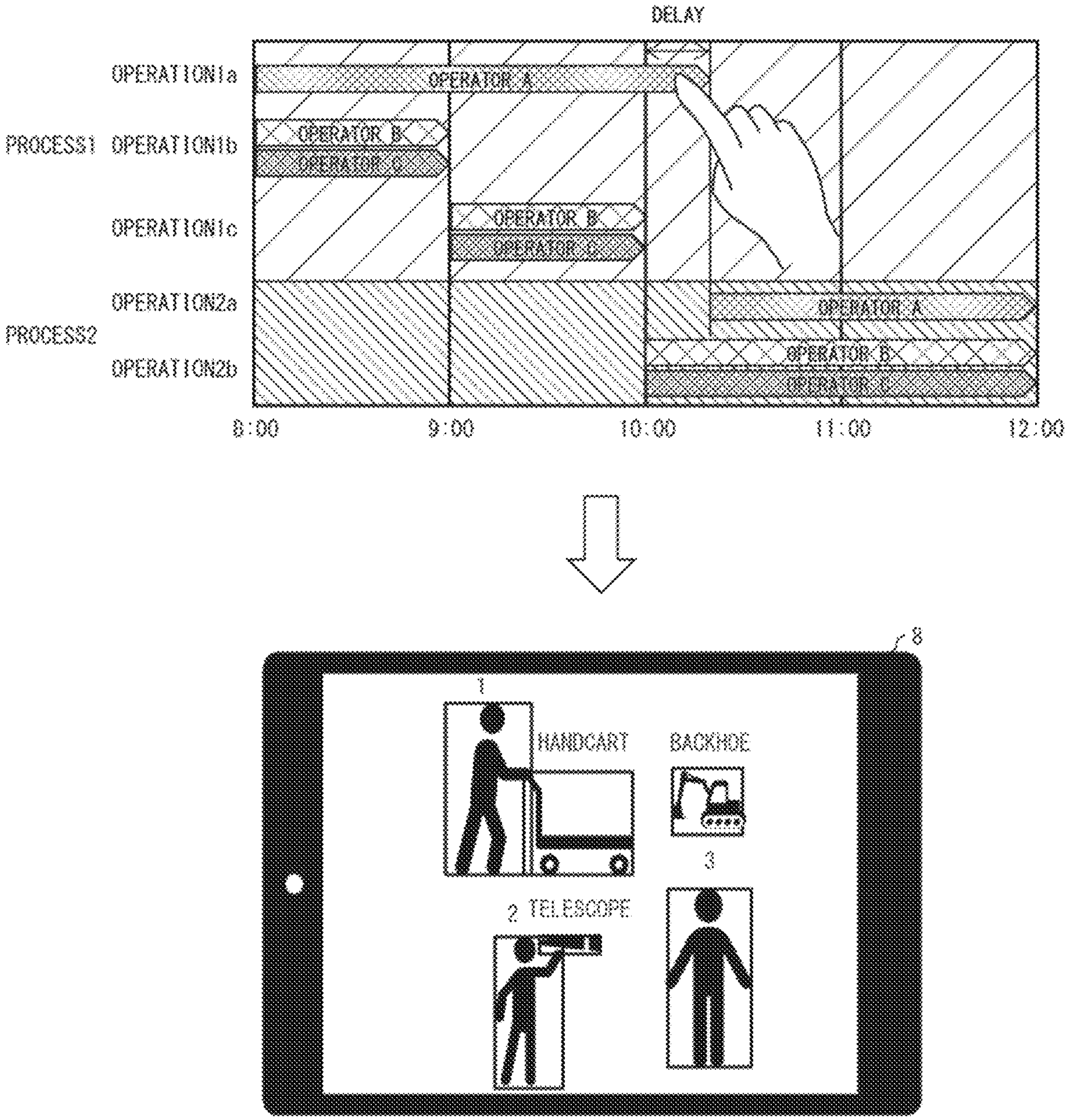
FIG. 12 is a diagram illustrating an example of an image which is output by a display section according to a variation of the present invention.

The display section 15 may be configured to acquire, from the display apparatus 8, information indicating a user operation with respect to the display apparatus 8, and carry out a process in accordance with the information. The following description will discuss this configuration with reference to FIG. 12. FIG. 12 is a diagram illustrating an example of an image which is output by the display section 15 according to the present variation.

For example, the following description assumes a case where the display section 15 outputs an image indicated in the upper part of FIG. 12, and the display apparatus 8 displays the image. The image illustrated in the upper part of FIG. 12 indicates that an "operation 1*a*" of a "process 1" is delayed by "15 minutes". In this state, upon receipt of a user operation of selecting a period ("10:00" to "10:15") in which the "operation 1*a*" of the "process 1" is delayed by "15 minutes", the display apparatus 8 outputs information indicating the user operation to the information processing apparatus 2.

Upon acquisition of the information output from the display apparatus 8, the display section 15 of the information processing apparatus 2 outputs an image with reference to the information. For example, the display section 15 outputs an image for a period between a start time "8:00" and an end time "10:15" during which the operation "operation 1*a*" indicated by the acquired information was recognized.

As another example, the display section 15 divides, by a predetermined time period, an image to be displayed. Then, the display section 15 outputs an image that is in a period indicated by acquired information and that includes an image in which an operation "operation 1*a*" indicated by the acquired information has been recognized. In this configuration, for example, it is assumed that the display section 15 has acquired information indicating that the user has selected a period ("10:00" to "10:15") in which the "operation 1*a*" of the "process 1" is delayed by "15 minutes". In this case, in a case where an image to be displayed is divided by 30 minutes, the display section 15 outputs an image which has been recognized as the "operation 1*a*" and which is for 30 minutes (e.g., "9:45" to "10:15") including "10:00" to "10:15".

Here, the image displayed by the display section 15 can be a moving image or a still image.

(Variation of Detection Section 11)

The detection section 11 may detect an operator and an operation object using a machine learning model. The following description will discuss annotation information that is used in machine learning of a machine learning model, in a case where the detection section 11 uses the machine learning model.

Figures 13, 14:
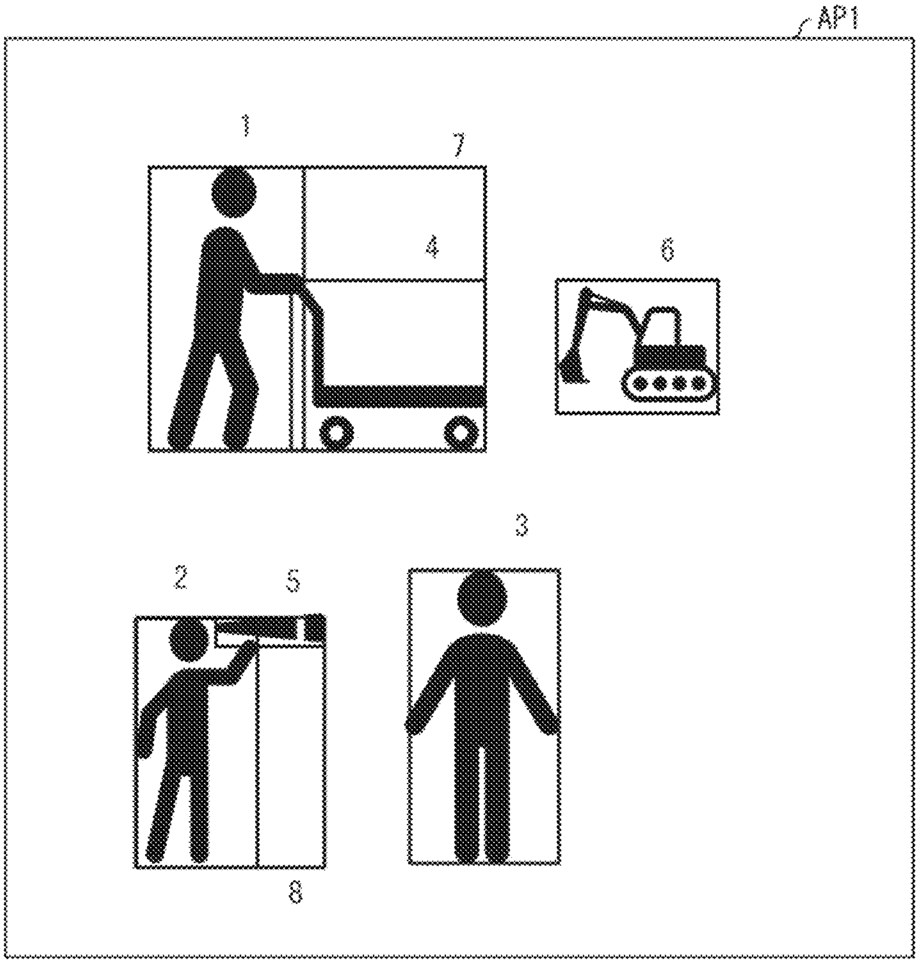
FIG. 13 is a diagram illustrating an example of an image which is included in annotation information in a variation of the present invention.
FIG. 14 is a diagram illustrating an example of information indicating a person and an object included in annotation information in a variation of the present invention.

The machine learning model used by the detection section 11 is trained using annotation information in which sensor information is paired with information that indicates a person and an object indicated by the sensor information. The following description will discuss, with reference to FIGS. 13 and 14, an example case where an image is used as sensor information. FIG. 13 is a diagram illustrating an example of an image AP1 which is included in annotation information according to the present variation. FIG. 14 is a diagram illustrating an example of information indicating a person and an object included in annotation information according to the present variation.

As illustrated in FIG. 13, in the image AP1 included in the annotation information, rectangle numbers are respectively assigned to circumscribed rectangles of persons and objects which are included in the image AP1 as subjects. For example, a rectangle number "1" is assigned to a circumscribed rectangle of a person pushing a handcart, and a rectangle number "4" is assigned to a circumscribed rectangle of the handcart.

Next, as illustrated in the upper part of FIG. 14, information indicating the person and the object included in the annotation information is associated with a rectangle number, an object label indicating whether a person or an object is included in a circumscribed rectangle with the rectangle number, and position information indicating a position of the circumscribed rectangle. For example, a rectangle number "1" which indicates a circumscribed rectangle of a person pushing a handcart is associated with an object label "person" and position information "x11, y11, x12, y12, x13, y13, x14, y14" which indicate positions of four corners of the circumscribed rectangle.

The position information can be represented by information indicating a position of any of the four corners of the circumscribed rectangle and a width and a height of the circumscribed rectangle. For example, as illustrated in FIG. 13, a rectangle number "4", which indicates a circumscribed rectangle of the handcart, is associated with an object label "object" and with, as position information, "x41, y41" indicating a position of any of four corners of the circumscribed rectangle and a width "w2" and a height "h2" of the circumscribed rectangle.

By thus training the machine learning model used by the detection section 11 with annotation information in which sensor information is paired with information indicating a person and an object indicated by the sensor information, it is possible to train the machine learning model with higher accuracy.

(Variation of Recognition Section 12)

The recognition section 12 may recognize, using an inference model, an action of an operator detected by the detection section 11.

An example of an inference model used by the recognition section 12 is a model into which information indicating a feature of a person and information pertaining to an object are input and from which information indicating a relevance between the person and the object in a predetermined action is output.

In this configuration, the recognition section 12 inputs, into the inference model, information indicating a feature of an operator detected by the detection section 11 and information pertaining to an object detected by the detection section 11. Then, the recognition section 12 recognizes an action of an operator with reference to information that has been output from the inference model and that indicates a relevance between the person and the object in the predetermined action.

For example, in a case where information which has been output from the inference model and which indicates a relevance between a person and an object indicates a fact that the person is related to the object, the recognition section 12 recognizes that the person is carrying out an action using the object. For example, in a case where information which has been output from the inference model and which indicates a relevance between a person and an object indicates a fact that a certain person is related to a handcart, the recognition section 12 recognizes that an operation of the certain person is an operation "transportation" using the handcart.

As described above, the recognition section 12 recognizes an action of an operator detected by the detection section 11 by using the model into which information indicating a feature of a person and information pertaining to an object are input and from which information indicating a relevance between the person and the object in a predetermined action is output. Therefore, the recognition section 12 can recognize, with higher accuracy, an action of an operator.

(Inference Model Used by Recognition Section 12)

Figure 15:
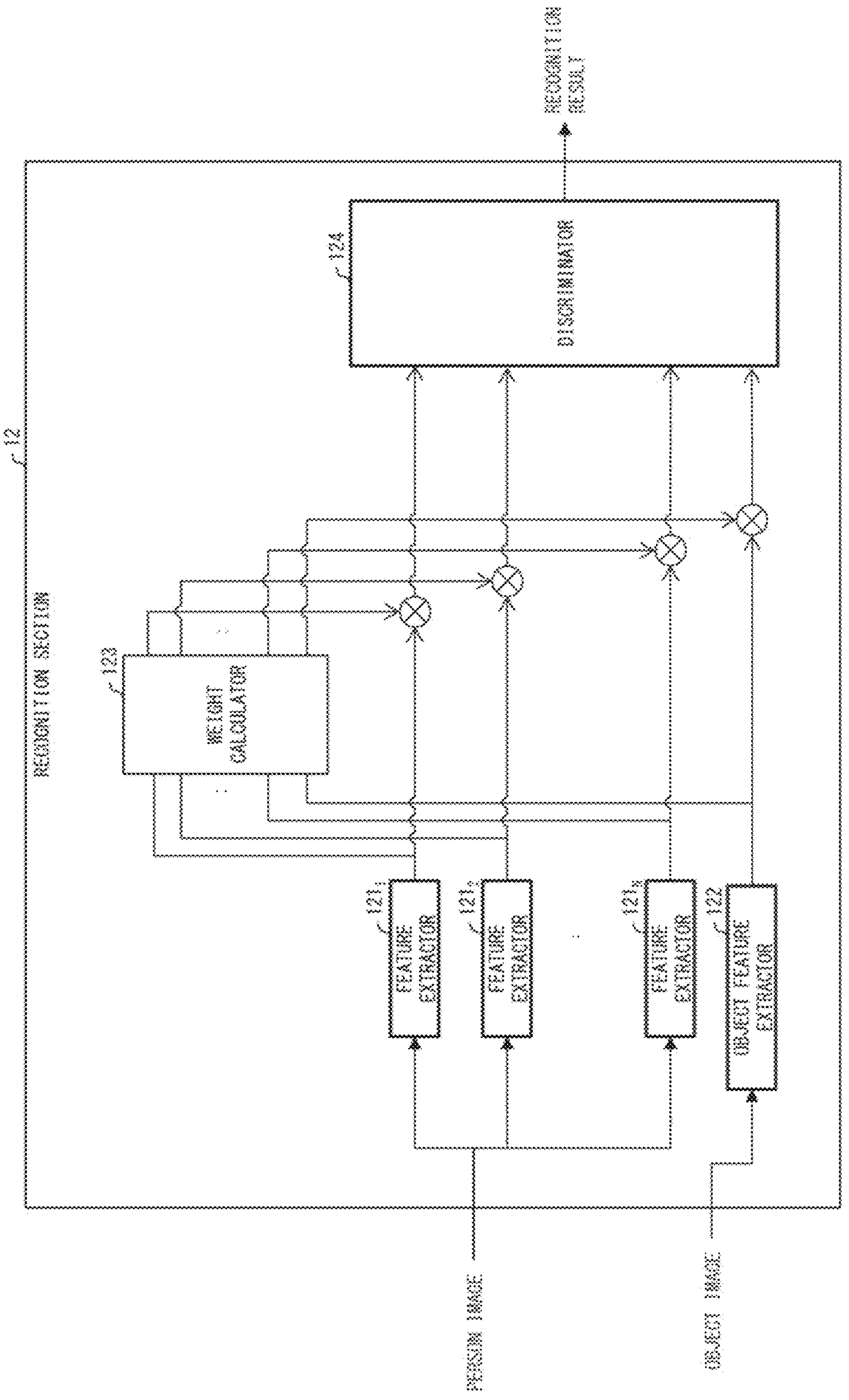
FIG. 15 is a diagram illustrating an example configuration of an inference model which is used by a recognition section according to a variation of the present invention.

The following description will discuss an example configuration of an inference model used by the recognition section 12, with reference to FIG. 15. FIG. 15 is a diagram illustrating an example configuration of an inference model which is used by the recognition section 12 according to the present variation.

As illustrated in FIG. 15, the recognition section 12 includes a feature extractor 121, an object feature extractor 122, a weight calculator 123, and a discriminator 124.

Into the feature extractor 121, a person image including a person as a subject is input. The feature extractor 121 outputs a feature of the person who is included in the person image as the subject. As illustrated in FIG. 15, the recognition section 12 can be configured to include a plurality of feature extractors $\mathbf{121}_1$ through $\mathbf{121}_N$ that output features of different persons. For example, it is possible to employ a configuration in which the feature extractor $\mathbf{121}_1$ outputs a feature of a shape of a person who is included in a person image as a subject, and the feature extractor $\mathbf{121}_2$ outputs a feature of a posture of the person who is included in the person image as the subject.

Into the object feature extractor 122, an object image including an object as a subject is input. The object feature extractor 122 outputs information pertaining to the object which is included in the object image as the subject. The information pertaining to the object output by the object feature extractor 122 can be a feature of the object or can be an object name that specifies the object. The object feature extractor 122 can further include, in output information pertaining to an object, position information indicating a position of the object.

The weight calculator 123 gives weights to respective features output from the feature extractors $\mathbf{121}_1$ through $\mathbf{121}_N$. In other words, the recognition section 12 refers to a plurality of weighed features.

Into the discriminator 124, a feature output from the feature extractor 121 and information pertaining to an object output from the object feature extractor 122 are input, and the discriminator 124 outputs information indicating a relevance between the person and the object in a predetermined action. In other words, the discriminator 124 outputs, based on a feature output from the feature extractor 121 and information pertaining to an object output from the object feature extractor 122, information indicating a relevance between the person and the object in a predetermined action.

As described above, the discriminator 124 may receive, as input, a plurality of features output from the plurality of feature extractors $\mathbf{121}_1$ through $\mathbf{121}_N$. In other words, the recognition section 12 can be configured to recognize an action of a person based on a relevance between a plurality of features of the person and information pertaining to the object. With this configuration, the recognition section 12 can recognize, with higher accuracy, an action of a person.

(Machine Learning of Inference Model)

The following description will discuss annotation information that is used in machine learning of an inference model used by the recognition section 12.

The inference model used by the recognition section 12 is trained using annotation information in which sensor information is paired with relevant information that indicates a relevance between a person and an object indicated by the sensor information. The following description will discuss, with reference to FIGS. 13, 16, and 17, an example case where the foregoing image AP1 indicated in FIG. 13 is used as sensor information. FIG. 16 is a diagram illustrating an example of relevant information which is included in annotation information according to the present variation. FIG. 17 is a diagram illustrating another example of relevant information which is included in annotation information according to the present variation.

As illustrated in FIG. 13, in the image AP1 included in the annotation information, rectangle numbers are respectively assigned to circumscribed rectangles of persons and objects which are included in the image AP1 as subjects. For example, a rectangle number "1" is assigned to a circumscribed rectangle of a person pushing a handcart, and a rectangle number "4" is assigned to a circumscribed rectangle of the handcart. Moreover, as illustrated in FIG. 13, a rectangle number is also assigned to a circumscribed rectangle including a person and an object which are related to each other. For example, a rectangle number "7" is assigned to a circumscribed rectangle including the handcart and the person pushing the handcart.

Next, in the relevant information included in the annotation information, as illustrated in the upper part of FIG. 16, rectangle numbers and group numbers each indicating a relevance are associated with each other. For example, in the upper part of FIG. 16, a rectangle number "1" indicating a person pushing a handcart and a rectangle number "4" indicating the handcart are related to each other, and therefore a group number "1" is associated to both of the rectangle numbers.

As illustrated in the lower part of FIG. 16, the relevant information can be in a matrix form. For example, in the lower part of FIG. 16, a value at a position where a column (or row) of the rectangle number "1" indicating a person pushing a handcart and a row (or column) of the rectangle number "4" indicating the handcart intersect with each other is "1" which indicates that there is a relevance.

The relevant information indicating a relevance between a person and an object can be configured to include an action label indicating an action of the person and position information. For example, as illustrated in FIG. 17, the relevant information can be configured to include (i) position information "x71, y71, x72, y72, x73, y73, x74, y74" indicating positions of four corners of a circumscribed rectangle of a person pushing a handcart and the handcart and (ii) an action label "transportation" indicating an operation of the person pushing the handcart.

By thus training the inference model used by the recognition section 12 with annotation information in which sensor information is paired with relevant information indicating a relevance between a person and an object indicated by the sensor information, it is possible to train the inference model with higher accuracy.

(Variation of Measurement Section 13)

Figure 18:
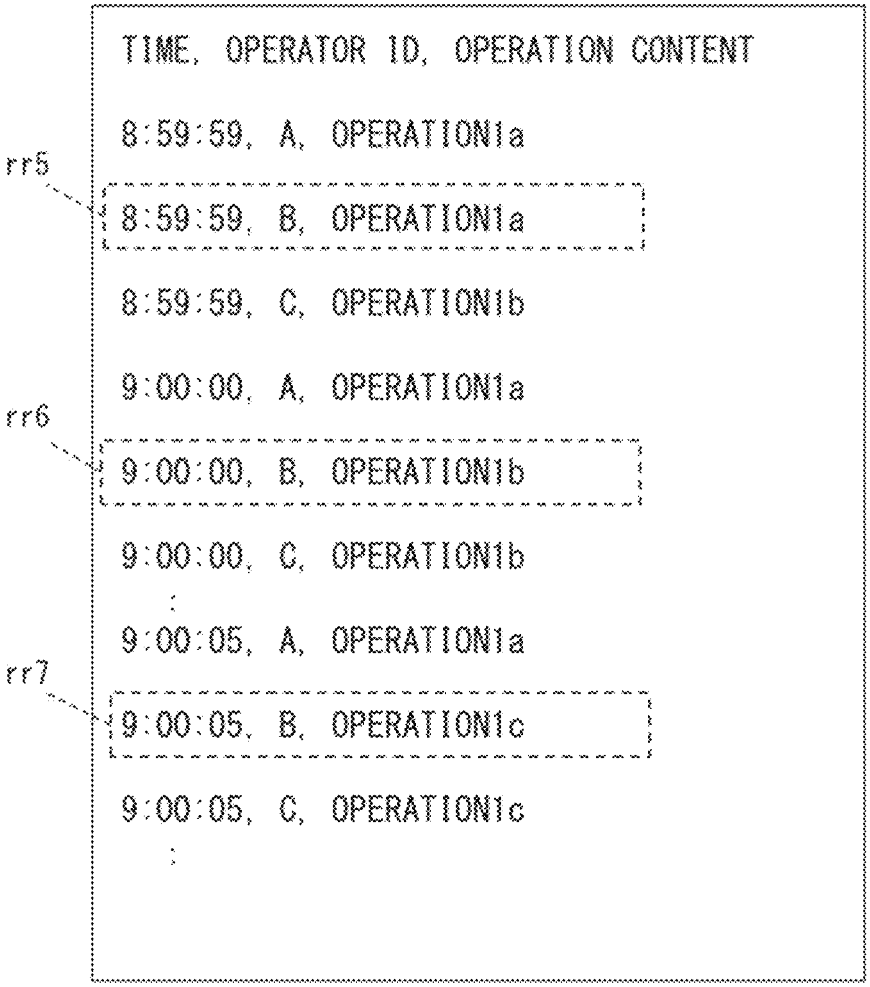
FIG. 18 is a diagram illustrating an example of a table indicating recognition results in a variation of the present invention.

The measurement section 13 can have a configuration in which, in a case where a duration of an operation is less than a predetermined time period (e.g., 15 seconds, 1 minute, or the like), the duration of the operation is included in a duration of an operation which is carried out immediately before that operation or in a duration of an operation which is carried out immediately after that operation. The following description will discuss this configuration with reference to FIG. 18. FIG. 18 is a diagram illustrating an example of a table indicating recognition results in the present variation.

In a case where the recognition results by the recognition section 12 are as indicated in the table illustrated in FIG. 18, the measurement section 13 measures, with reference to the table illustrated in FIG. 18, a time period for which an operator has continued an operation. For example, the measurement section 13 extracts recognition results rr5 through rr7 in which the operator ID is "B", and measures a time period for which the operator with the operator ID of "B" has continued the operation. Here, the following description assumes a configuration in which, in a case where a duration of the operation is less than 15 seconds, the duration of the operation is included in a duration of an operation which is carried out immediately before that operation. In the example of the table illustrated in FIG. 18, the time period for which the operator with the operator ID of "B" has carried out operation content "operation 1*b*" is "4 seconds" between "9:00:00" and "9:00:04". In this case, the measurement section 13 includes the period between "9:00:00" and "9:00:04" in a duration of an operation of operation content "operation 1*a*", which is an operation carried out immediately before the operation content "operation 1*b*".

In a case where a duration of an operation is short, there is a high possibility of erroneous recognition by the recognition section 12. However, as in the above configuration, the measurement section 13 can ascertain, with higher accuracy, a time period for which a person has continued an action even in a case where a duration of the operation is less than a predetermined time period and the recognition section 12 has made erroneous recognition by including the duration of that operation in a duration of an operation carried out immediately before that operation or in a duration of an operation carried out immediately after that operation.

(Other Variations)

In the present example embodiment, it is possible to output information indicating a degree of divergence in another form in place of or in addition to displaying the information as an image. For example, in the present example embodiment, it is possible to include an audio output section in place of or in addition to the display section 15. In this case, the audio output section may output, to an audio output apparatus, audio indicating a degree of divergence.

[Software Implementation Example]

The functions of part of or all of the information processing apparatuses 1 and 2 can be realized by hardware such as an integrated circuit (IC chip) or can be alternatively realized by software.

Figure 19:
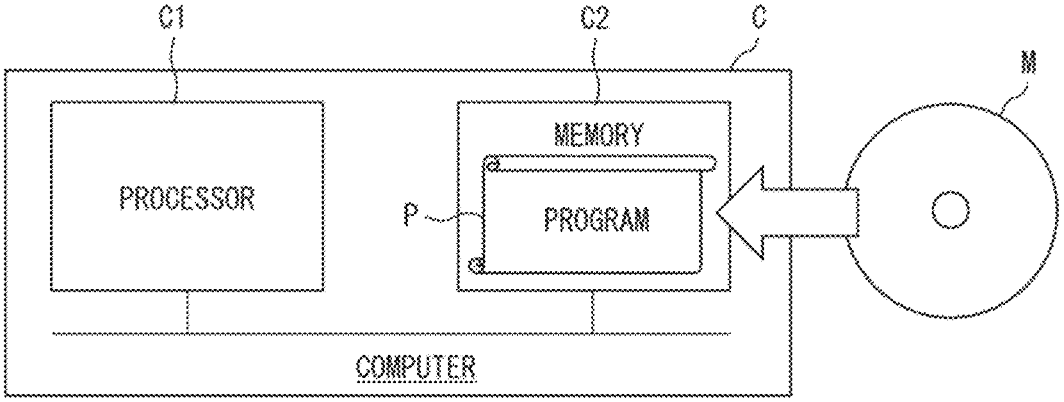
FIG. 19 is a block diagram illustrating an example of a hardware configuration of the information processing apparatus according to each of the example embodiments of the present invention.

In the latter case, each of the information processing apparatuses 1 and 2 is realized by, for example, a computer that executes instructions of a program that is software realizing the foregoing functions. FIG. 19 illustrates an example of such a computer (hereinafter, referred to as "computer C"). The computer C includes at least one processor C1 and at least one memory C2. The memory C2 stores a program P for causing the computer C to function as the information processing apparatuses 1 and 2. In the computer C, the processor C1 reads the program P from the memory C2 and executes the program P, so that the functions of the information processing apparatuses 1 and 2 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following supplementary notes.

Supplementary Note 1

An information processing apparatus, including: a detection means of detecting a person and an object based on sensor information; a recognition means of recognizing an action of the person based on a relevance between the person and the object; a measurement means of measuring, based on a recognition result of the action, a time period for which the person has continued the action; and a generation means of generating information indicating a degree of divergence from an action plan based on (i) the time period which has been measured and for which the action has been continued and (ii) a time period which is included in the action plan planned for the action and for which the action should be continued, the action plan being related to the action of the person which has been recognized.

Supplementary Note 2

The information processing apparatus according to supplementary note 1, further including a display means of displaying the information indicating the degree of divergence.

Supplementary Note 3

The information processing apparatus according to supplementary note 2, in which: the display means displays the time period which is included in the action plan and for which the action should be continued.

Supplementary Note 4

The information processing apparatus according to any one of supplementary notes 1 through 3, in which: the recognition means recognizes a plurality of actions; the measurement means measures a time period for which each of the plurality of actions has been continued; and the generation means generates information indicating the degree of divergence based on (i) the time period which has been measured and for which each of the plurality of actions has been continued and (ii) a time period which is included in an action plan planned for all of the plurality of actions and for which each of the plurality of actions should be continued.

Supplementary Note 5

The information processing apparatus according to supplementary note 4, in which: the generation means generates, for each of the plurality of actions, the information indicating the degree of divergence.

Supplementary Note 6

The information processing apparatus according to supplementary note 4 or 5, in which: each of the plurality of actions which have been recognized by the recognition means is an operation included in any of a plurality of processes; and the generation means generates, for each of the plurality of processes, the information indicating the degree of divergence.

Supplementary Note 7

The information processing apparatus according to any one of supplementary notes 1 through 6, in which: the detection means detects a plurality of persons; the recognition means recognizes an action for each of the persons; the measurement means measures, for each of the plurality of persons, a time period for which the action has been continued; and the generation means generates, for each of the plurality of persons, information indicating the degree of divergence.

Supplementary Note 8

An information processing method, including: detecting, by an information processing apparatus, a person and an object based on sensor information; recognizing, by the information processing apparatus, an action of the person based on a relevance between the person and the object; measuring, by the information processing apparatus based on a recognition result of the action, a time period for which the person has continued the action; and generating, by the information processing apparatus, information indicating a degree of divergence from an action plan based on (i) the time period which has been measured and for which the action has been continued and (ii) a time period which is included in the action plan planned for the action and for which the action should be continued, the action plan being related to the action of the person which has been recognized.

Supplementary Note 9

A program for causing a computer to function as an information processing apparatus, the program causing the computer to function as: a detection means of detecting a person and an object based on sensor information; a recognition means of recognizing an action of the person based on a relevance between the person and the object; a measurement means of measuring, based on a recognition result of the action, a time period for which the person has continued the action; and a generation means of generating information indicating a degree of divergence from an action plan based on (i) the time period which has been measured and for which the action has been continued and (ii) a time period which is included in the action plan planned for the action and for which the action should be continued, the action plan being related to the action of the person which has been recognized.

Supplementary Note 10

An information processing apparatus, including at least one processor, the at least one processor carrying out: a detection process of detecting a person and an object based on sensor information; a recognition process of recognizing an action of the person based on a relevance between the person and the object; a measurement process of measuring, based on a recognition result of the action, a time period for which the person has continued the action; and a generation process of generating information indicating a degree of divergence from an action plan based on (i) the time period which has been measured and for which the action has been continued and (ii) a time period which is included in the action plan planned for the action and for which the action should be continued, the action plan being related to the action of the person which has been recognized.

Note that the information processing apparatus can further include a memory. The memory can store a program for causing the processor to carry out the detection process, the recognition process, and the measurement process, and the generation process. The program can be stored in a computer-readable non-transitory tangible storage medium.

REFERENCE SIGNS LIST

1, 2: Information processing apparatus
8: Display apparatus
11: Detection section
12: Recognition section
13: Measurement section
14: Generation section
15: Display section
16: Acquisition section
100: Information processing system

The invention claimed is:

1. An information processing apparatus, comprising at least one processor, the at least one processor carrying out:
- a detection process of detecting a person, a first object, and a second object based on a plurality of images included in sensor information;
- a recognition process of recognizing a first action of the person based on a distance between the person and the first object being equal to or less than a predetermined length;
- a measurement process of measuring, based on a recognition result of the first action, a time period for which the person has continued the first action; and
- a generation process of generating information indicating a degree of divergence from an action plan based on (i) the time period which has been measured and for which the first action has been continued and (ii) a time period which is included in the action plan planned for the first action and for which the first action is to be continued, the action plan being related to the first action of the person which has been recognized;
- wherein the recognition process is configured to recognize an unidentified action occurring between the first action and a second action related to the second object,
- wherein the measurement process measures the time period of the first action by:

calculating, during the unidentified action, a first distance between the person and the first object and a second distance between the person and the second object; and adding a duration of the unidentified action to the time period of the first action in a case where the second distance is greater than the first distance, and wherein the detection process is based on the sensor information acquired from a plurality of sensors, and wherein the recognition process performs decision making based on a majority decision to identify the first object or the second object when detection results differ among the plurality of sensors.

2. The information processing apparatus according to claim 1, wherein:

the at least one processor further carries out a display process of displaying the information indicating the degree of divergence.

3. The information processing apparatus according to claim 2, wherein:

in the display process, the at least one processor displays the time period which is included in the action plan and for which the action is to be continued.

4. The information processing apparatus according to claim 1, wherein:

in the recognition process, the at least one processor recognizes a plurality of actions;

in the measurement process, the at least one processor measures a time period for which each of the plurality of actions has been continued; and in the generation process, the at least one processor generates information indicating the degree of divergence based on (i) the time period which has been measured and for which each of the plurality of actions has been continued and (ii) a time period which is included in an action plan planned for all of the plurality of actions and for which each of the plurality of actions is to be continued.

5. The information processing apparatus according to claim 4, wherein:

in the generation process, the at least one processor generates, for each of the plurality of actions, the information indicating the degree of divergence.

6. The information processing apparatus according to claim 4, wherein:

each of the plurality of actions which have been recognized in the recognition process is an operation included in any of a plurality of processes; and in the generation process, the at least one processor generates, for each of the plurality of processes, the information indicating the degree of divergence.

7. The information processing apparatus according to claim 1, wherein:

in the detection process, the at least one processor detects a plurality of persons;

in the recognition process, the at least one processor recognizes an action for each of the persons;

in the measurement process, the at least one processor measures, for each of the plurality of persons, a time period for which the action has been continued; and in the generation process, the at least one processor generates, for each of the plurality of persons, information indicating the degree of divergence.

8. An information processing method, comprising:

detecting, by at least one processor, a person, a first object, and a second object based on a plurality of images included in sensor information;

recognizing, by the at least one processor, a first action of the person based on a distance between the person and the first object being equal to or less than a predetermined length;

measuring, by the at least one processor based on a recognition result of the first action, a time period for which the person has continued the first action; and generating, by the at least one processor, information indicating a degree of divergence from an action plan based on (i) the time period which has been measured and for which the first action has been continued and (ii) a time period which is included in the action plan planned for the first action and for which the first action is to be continued, the action plan being related to the first action of the person which has been recognized;

wherein the recognizing recognizes an unidentified action occurring between the first action and a second action related to the second object, wherein the measuring measures the time period of the first action by:

calculating, during the unidentified action, a first distance between the person and the first object and a second distance between the person and the second object; and adding a duration of the unidentified action to the time period of the first action in a case where the second distance is greater than the first distance, and wherein the detecting is based on the sensor information acquired from a plurality of sensors, and wherein the recognizing is decision making based on a majority decision to identify the first object or the second object when detection results differ among the plurality of sensors.

9. A computer-readable non-transitory storage medium storing a program for causing a computer to function as an information processing apparatus, the program causing the computer to carry out:

a detection process of detecting a person, a first object, and a second object based on a plurality of images included in sensor information;

a recognition process of recognizing a first action of the person based on a distance between the person and the first object being equal to or less than a predetermined length;

a measurement process of measuring, based on a recognition result of the first action, a time period for which the person has continued the first action; and a generation process of generating information indicating a degree of divergence from an action plan based on (i) the time period which has been measured and for which the first action has been continued and (ii) a time period which is included in the action plan planned for the first action and for which the first action is to be continued, the action plan being related to the first action of the person which has been recognized;

wherein the recognition process is configured to recognize an unidentified action occurring between the first action and a second action related to the second object, wherein the measurement process measures the time period of the first action by:

calculating, during the unidentified action, a first distance between the person and the first object and a second distance between the person and the second object; and adding a duration of the unidentified action to the time period of the first action in a case where the second distance is greater than the first distance, and wherein the detection process is based on the sensor information acquired from a plurality of sensors, and wherein the recognition process performs decision making based on a majority decision to identify the first object or the second object when detection results differ among the plurality of sensors.

10. The information processing apparatus according to claim 1, wherein the detection process detects the person, the first object, and the second object using a machine learning model.

* * * * *